(12) United States Patent
Rehkemper et al.

(10) Patent No.: US 11,731,060 B2
(45) Date of Patent: Aug. 22, 2023

(54) FLYING TOYS

(71) Applicant: Rehco, LLC, Chicago, IL (US)

(72) Inventors: Jeffrey Rehkemper, Chicago, IL (US); Adam Gelder, Oak Lawn, IL (US)

(73) Assignee: Rehco, LLC, Chicago, IL (US)

( * ) Notice: Subject to any disclaimer, the term of this patent is extended or adjusted under 35 U.S.C. 154(b) by 407 days.

(21) Appl. No.: 17/100,105

(22) Filed: Nov. 20, 2020

(65) Prior Publication Data

US 2021/0154589 A1    May 27, 2021

Related U.S. Application Data

(60) Provisional application No. 62/939,827, filed on Nov. 25, 2019.

(51) Int. Cl.
| | | |
|---|---|---|
| *A63H 29/16* | (2006.01) | |
| *A63H 27/00* | (2006.01) | |
| *B64D 27/08* | (2006.01) | |
| *B64C 11/00* | (2006.01) | |
| *B64C 5/02* | (2006.01) | |
| *B64C 5/06* | (2006.01) | |
| *B64D 37/06* | (2006.01) | |
| *F15B 15/20* | (2006.01) | |
| *A63H 29/24* | (2006.01) | |
| *B64D 37/04* | (2006.01) | |
| *A63H 27/26* | (2006.01) | |

(52) U.S. Cl.
CPC .......... *A63H 29/16* (2013.01); *A63H 27/00* (2013.01); *A63H 27/02* (2013.01); *A63H 27/06* (2013.01); *A63H 29/24* (2013.01); *B64C 5/02* (2013.01); *B64C 5/06* (2013.01); *B64C 11/00* (2013.01); *B64D 27/08* (2013.01); *B64D 37/04* (2013.01); *B64D 37/06* (2013.01); *F15B 15/20* (2013.01); *B64C 2203/00* (2013.01)

(58) Field of Classification Search
CPC ...... A63H 29/16; A63H 29/165; A63H 29/24; A63H 27/00; A63H 27/001; A63H 27/02; A63H 27/06; B64D 27/08; B64C 2203/00
See application file for complete search history.

(56) References Cited

U.S. PATENT DOCUMENTS

| | | | | |
|---|---|---|---|---|
| 4,897,065 | A * | 1/1990 | Fertig ................. | A63H 27/14 124/63 |
| 5,154,657 | A * | 10/1992 | Wildman ............. | A63H 29/165 124/63 |
| 6,006,517 | A * | 12/1999 | Kownacki ............. | F02B 75/34 60/407 |
| 6,079,954 | A * | 6/2000 | Kownacki ............. | A63H 27/14 446/212 |
| 6,186,854 | B1 * | 2/2001 | Lai ........................ | A63H 27/02 446/88 |
| 6,540,177 | B2 * | 4/2003 | Woo ...................... | B64C 33/00 244/22 |
| 6,938,856 | B2 * | 9/2005 | Frontera Castaner . | A63H 27/02 446/57 |

(Continued)

*Primary Examiner* — Eugene L Kim
*Assistant Examiner* — Alyssa M Hylinski
(74) *Attorney, Agent, or Firm* — Adam K. Sacharoff; Much Shelist, P.C.

(57) ABSTRACT

In one embodiment there is provided a flying toy that can be manually pumped with air. The pressurized air is kept in a canister and use to drive a propeller to propeller the toy for flight.

18 Claims, 39 Drawing Sheets

(56) References Cited

U.S. PATENT DOCUMENTS

| | | | |
|---|---|---|---|
| 2004/0163385 A1* | 8/2004 | Rehkemper | F01B 17/02 60/413 |
| 2005/0191930 A1* | 9/2005 | Foster | A63H 27/10 446/57 |
| 2018/0057145 A1* | 3/2018 | Sartorius | A63H 27/001 |

* cited by examiner

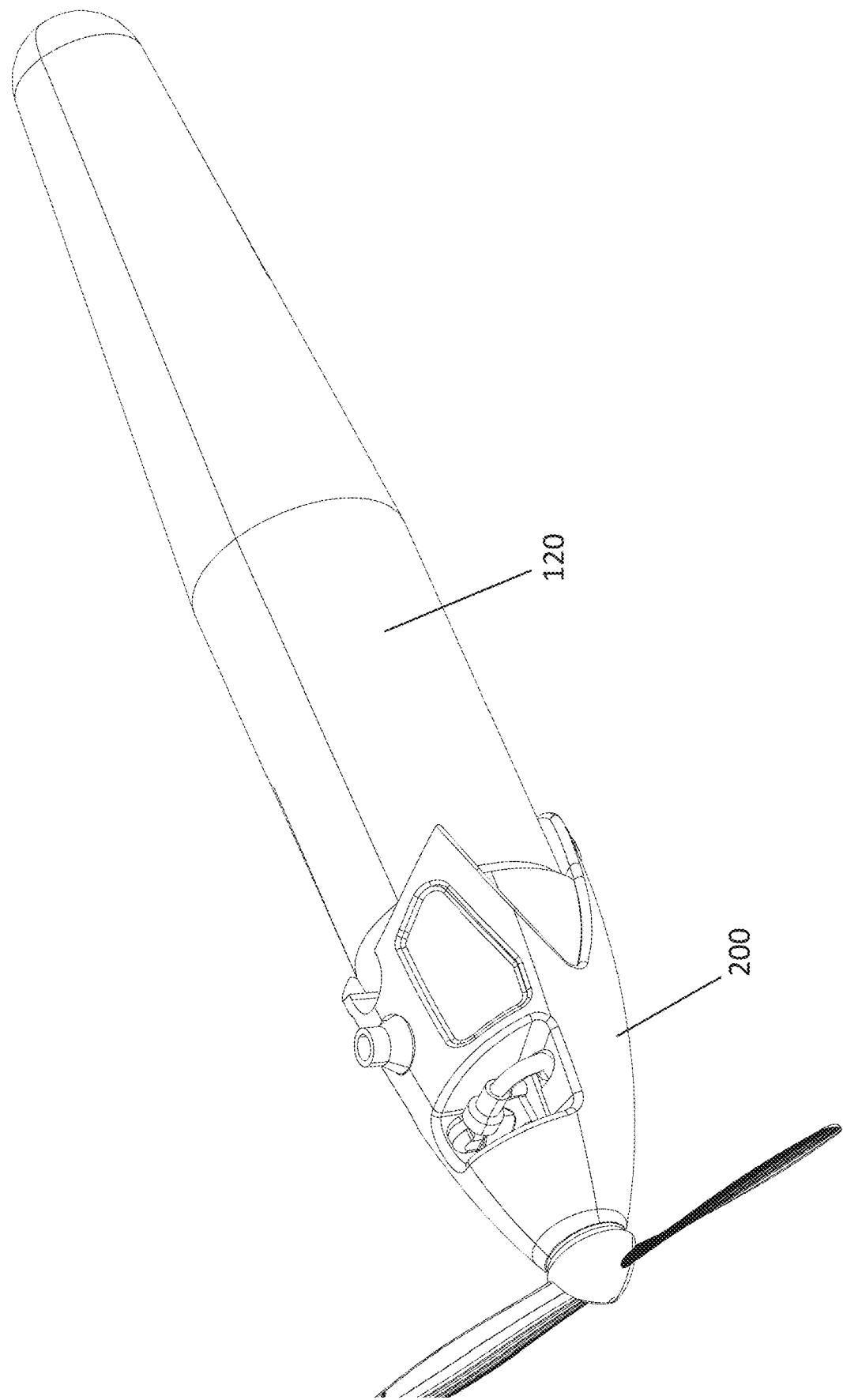

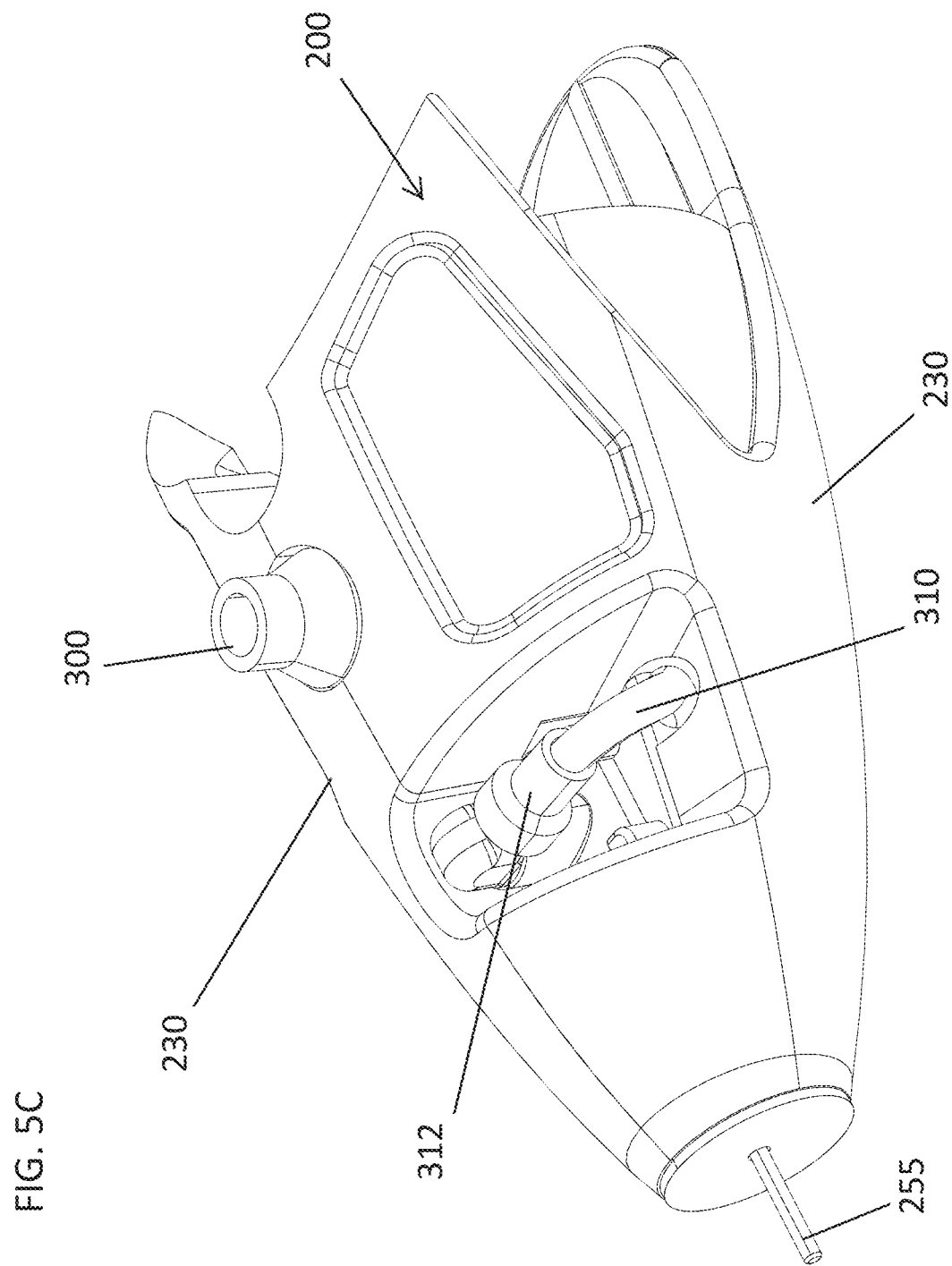

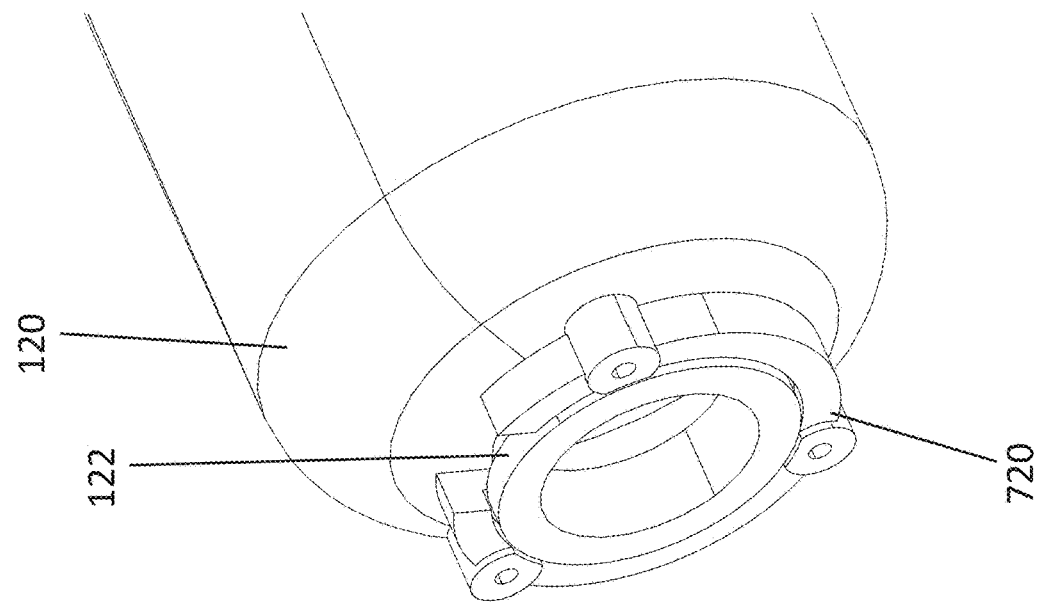
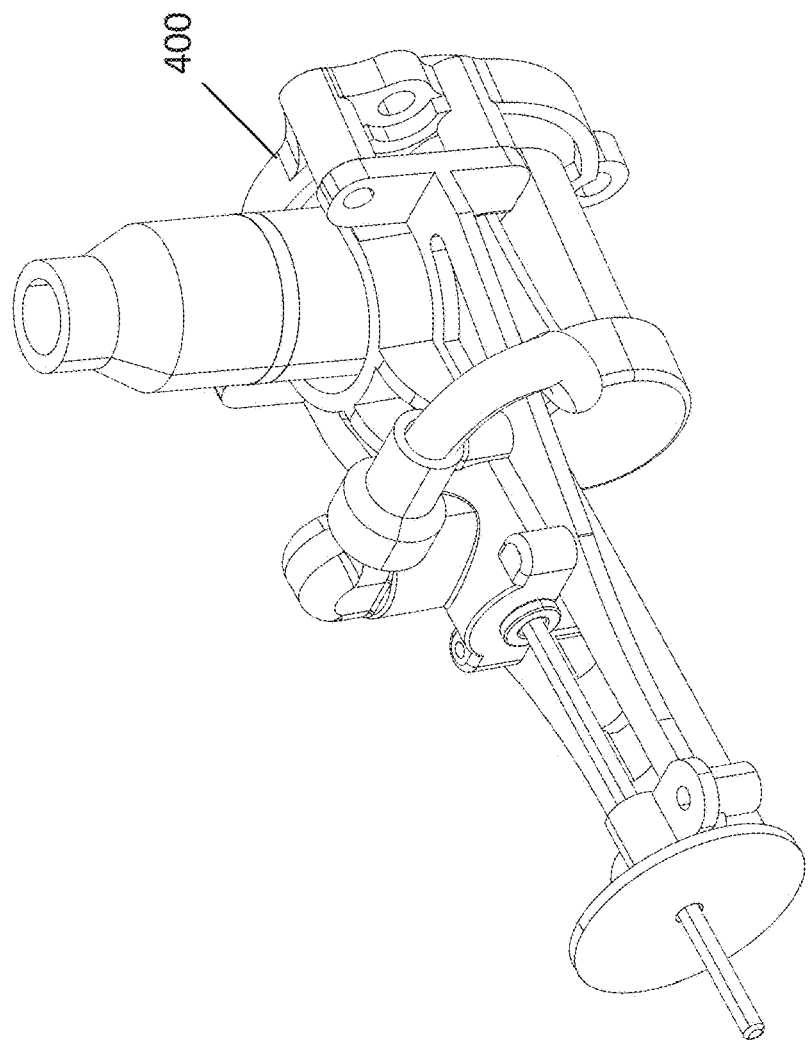
FIG. 25

FIG. 37
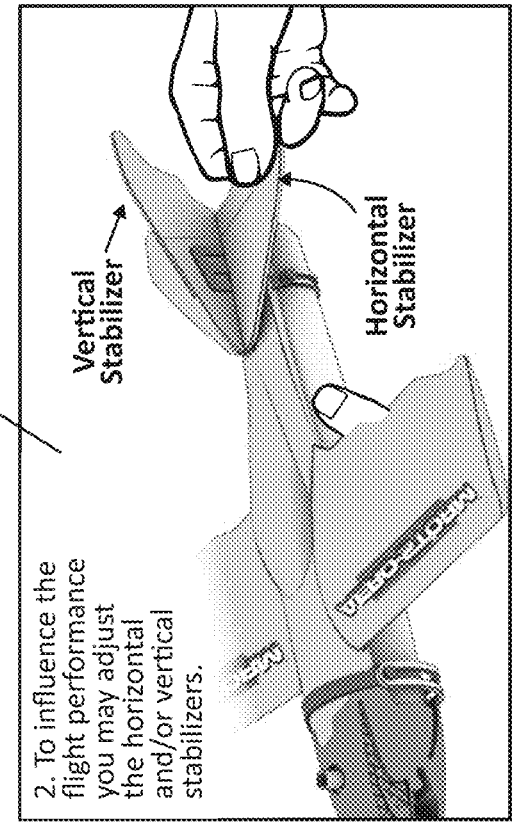
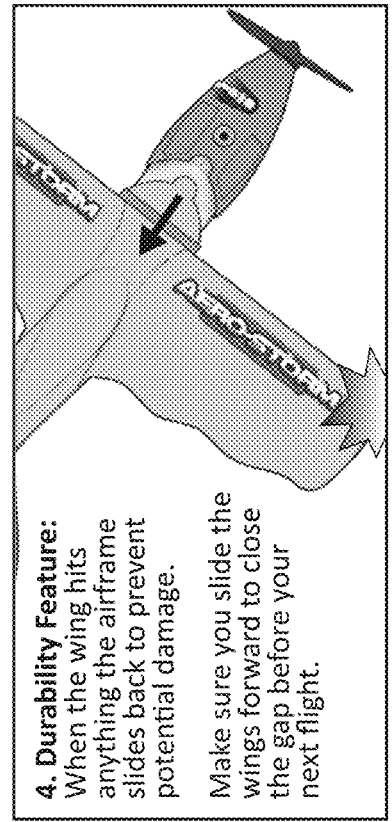
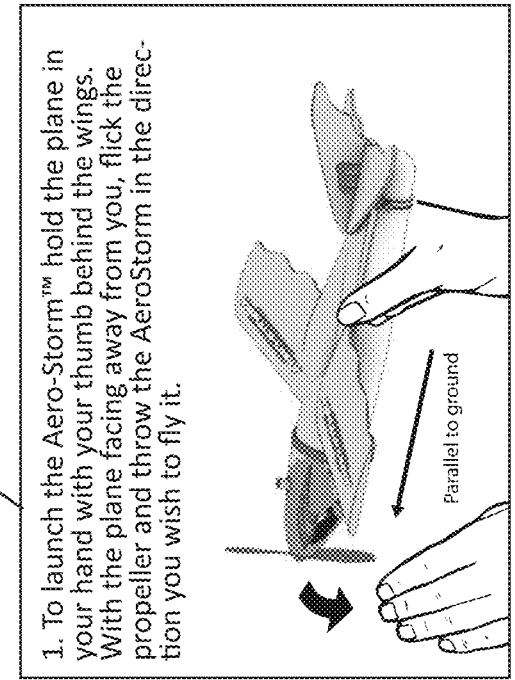
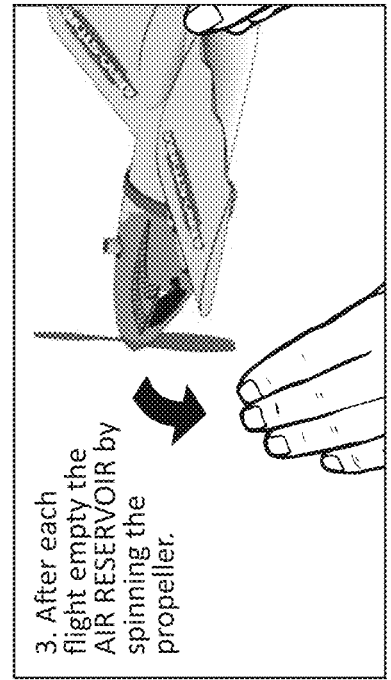

FLYING TOYS

CROSS REFERENCE TO RELATED APPLICATIONS

The present application claims priority to U.S. Provisional Application No. 62/939,827 filed Nov. 25, 2019.

FIELD OF THE INVENTION

This disclosure relates to flying toys.

BACKGROUND OF THE INVENTION

Toys may utilize various types of components to assist in generating lift for a flying toy. This includes a pneumatic engine that uses compressed air from an on-board reservoir to spin a propeller which propels a flying toy. An airframe with wings and a tail assembly are further included to assist in the generation of lift for the flying toy. However, the desire remains for improvements in such flying toys.

BRIEF DESCRIPTION OF THE DRAWINGS

A fuller understanding of the foregoing may be had by reference to the accompanying drawings, wherein:

FIGS. 5A-5C illustrate the nose section of the flying toy in accordance with one embodiment of the invention;
FIGS. 24-26 illustrate the canister connected to the manifold in accordance with one embodiment of the invention;
FIGS. 33-37 illustrate operation of the flying toy.

DETAILED DESCRIPTION OF THE EMBODIMENTS

Figure 1:
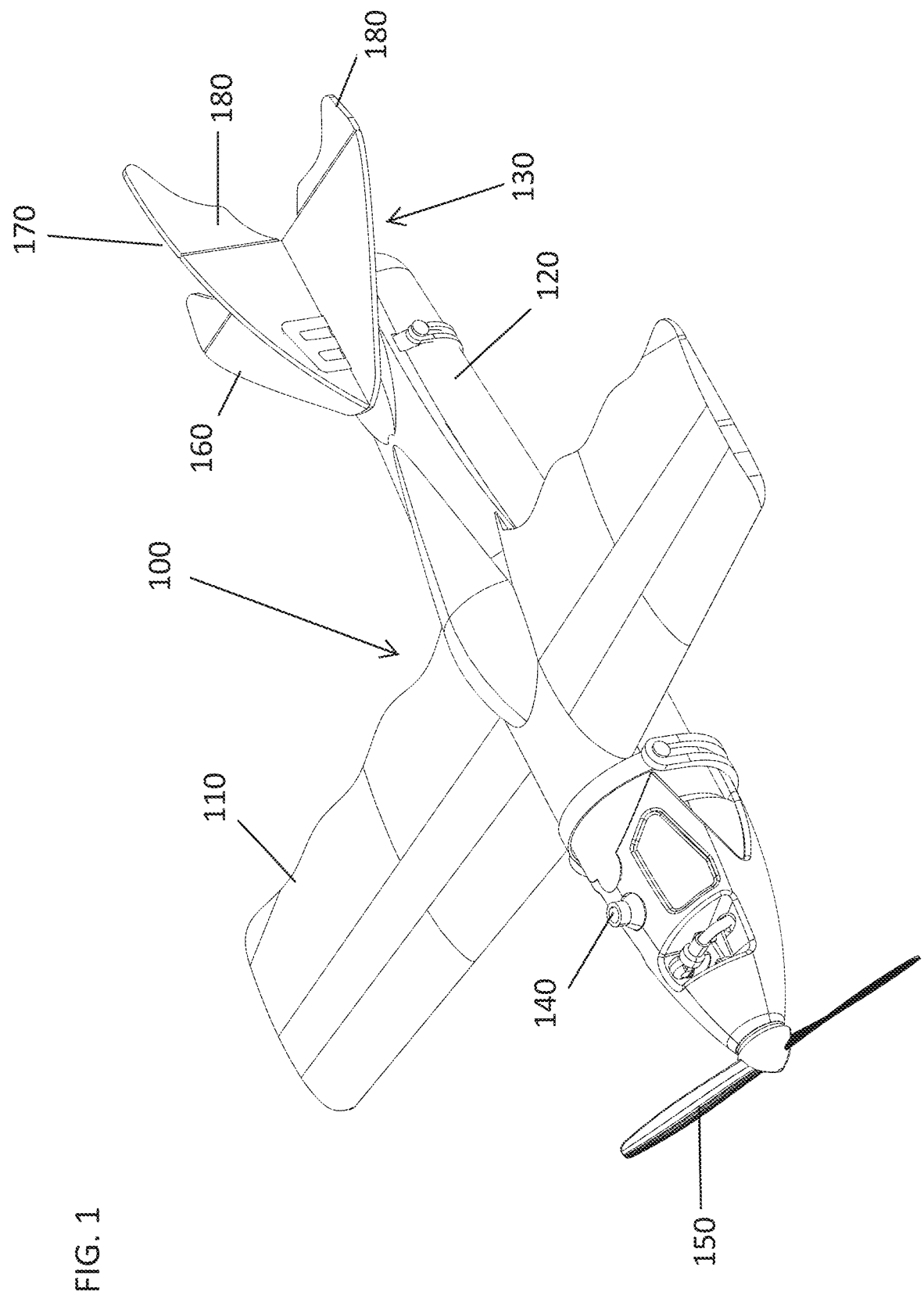
FIG. 1 shows a flying toy in accordance with an embodiment of the invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention or the embodiments illustrated.

Referring now to the FIGS. 1-37, there is shown in one or more of the embodiments a flying toy 100 that includes various aspects and embodiments that are unique to the industry. The flying toy includes an onboard refillable canister or reservoir that uses air manually pumped from an external attachable pump system into the reservoir. The canister has no threads and is attached by a flange to the manifold of the engine. The canister is also preferably cylindrical in nature but includes a taper towards the bottom or tail end. This is an improvement, as it reduces deforming, is stronger and more aerodynamic when in flight.

The user is capable of connecting the pump to the inlet and then manually pump air into the reservoir. The manifold is fastened by screws to a receptacle for the bosses of the screws. The receptacle snaps over the neck of the canister on one side of the flange configured to capture the flange between the manifold and receptacle. The manifold has three openings, a first opening or inlet to allow air from the pump to enter into the canister (via a one-way inlet valve), a second opening or exit that connects by a flexible tube to a pneumatic motor (via a one-way outlet valve), and a third opening that connects to a pressure release valve. The pressure release valve avoids over pressuring the canister.

The pneumatic motor has a single motor cylinder that is not molded with the manifold, the motor is mounted to a bracket forward of the manifold. The bracket is mounted with screws. The one-way valve is fastened to the manifold via glue. The one-way valve at the manifold is positioned upward to avoid debris from entering the intake. It also allows for the pump to locate and cradle the airplane. When pumping the plane, the ground holds the plane against the nozzle of the pump.

With respect to the pneumatic motor, the piston and connecting rod is molded as a single piece. The seal around the piston is floated on a channel defined on the piston. There is no spring to activate the air valve in the motor, a simple turn of the propeller will activate the motor. In most instances, the user can simply throw the flying toy to cause the rotation in the rotor. Moreover, any movement in the rotor, even a reverse movement will cause the rotor to begin rotation. The piston snaps onto the crank shaft that connects to the propeller. A one-way valve plug restricts the motor to run in a single direction. The one-way valve is a valve pin in a T shape with an o-ring around the head.

The main wing is made of an Expanded Polypropylene (EPP) material. It includes a forward tab that sits into a rounded opening formed when the two-piece nose section is assembled around the engine and manifold. During a crash the wing can separate from the nose section to help protect it from being damaged. To assembly, one simply must push on the tab into the nose section and the wing will go back into position. The wing is assembled or secured to the canister with two or more attachments (a curved flange over the wing with a flexible bank connecting the curved flange around the canister). The main wing further includes molded CG points and pockets that can be used to add weights to sure each flying toy is ready for flight. The tail assembly is unique as well and is further illustrated herein.

Looking more closely to the Figures, FIG. 1 shows the flying toy 100 illustrating the wing section 110 connected to the canister 120 and showing the tail assembly 130. The inlet 140 can be used when attached to a pump assembly to pump air into the canister. The propeller 150 can simply be turned (in either direction or the entire toy can be thrown) to activate the pneumatic motor to spin the propeller at a sufficient speed such that when a user throws the toy it will achieve flight. The tail assembly 130 includes horizontal stabilizers 160 and a vertical stabilizer 170 with bendable rudders 180 to allow various flight patterns.

Figure 2:
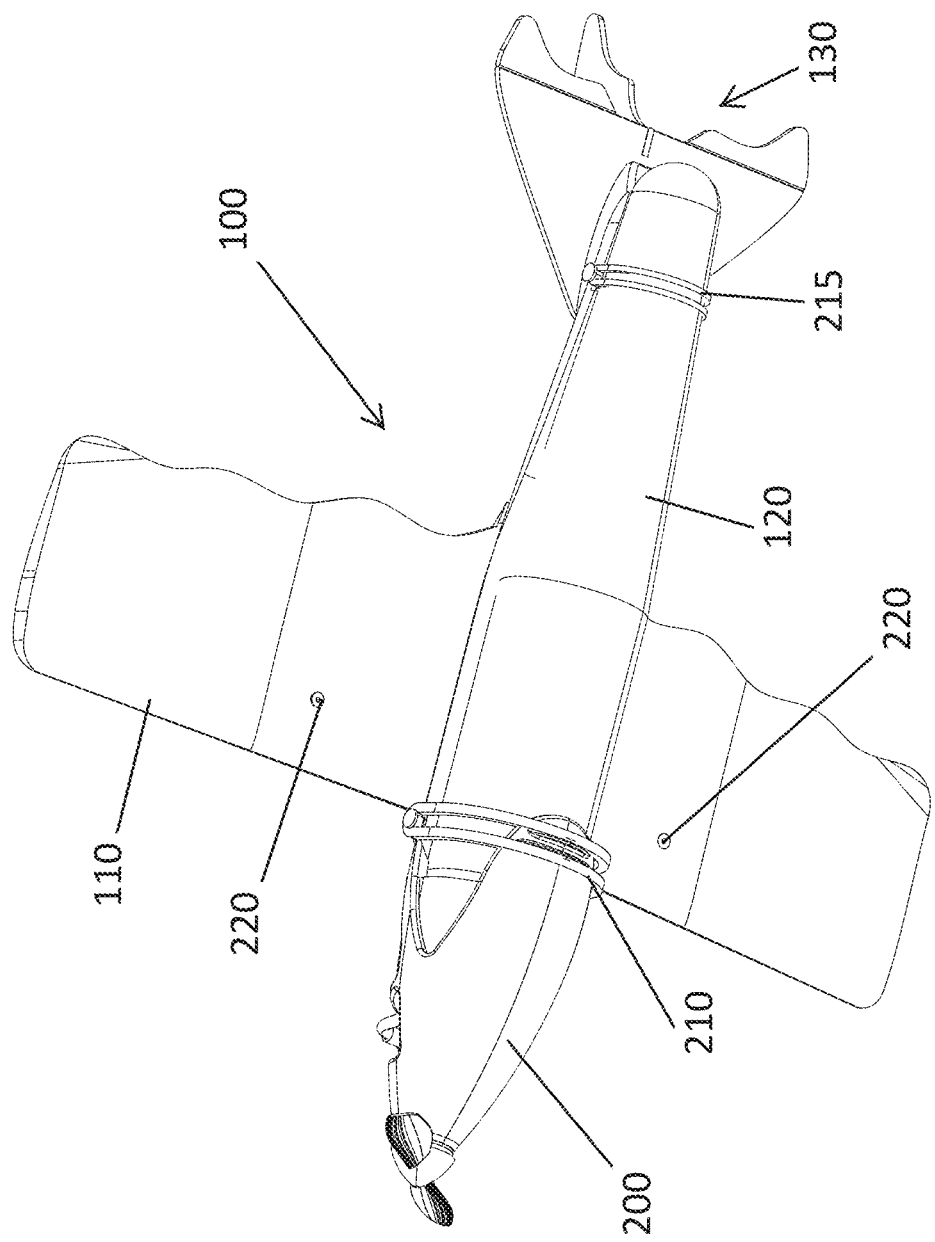
FIG. 2 is the underneath of the flying toy from FIG. 1.
Figure 3:
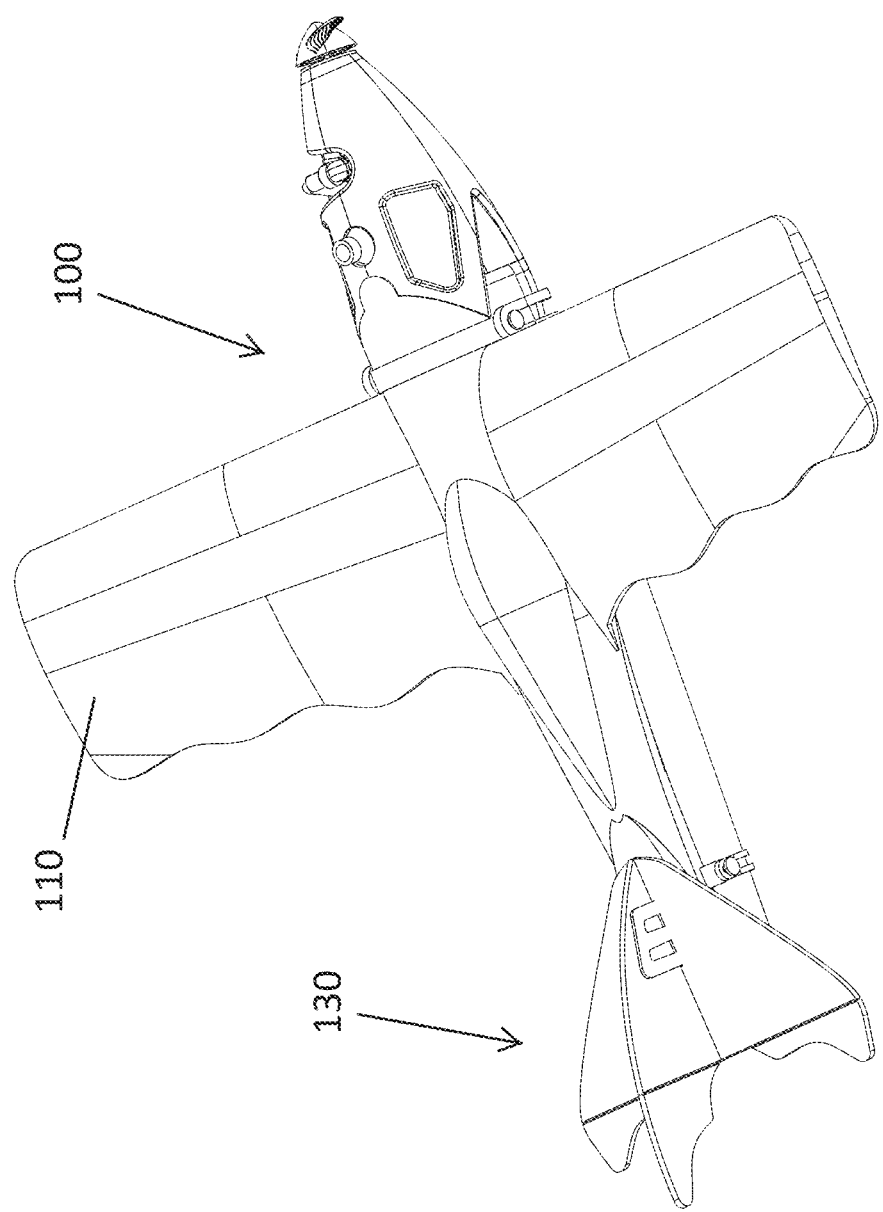
FIG. 3 is another view of the flying toy from FIG. 1.

FIGS. 2 and 3 show the flying toy 100 from underneath the toy. The canister 120 is shown in place against the nose section 200. The canister 120 has a front or forward end shown secured to the wing section 110 with a first or front fastener 210. A second or rear fastener 215 secures the end portion of the canister to the tail assembly 130. As discussed herein weight points 220 can also be seen secured under the wings.

Figure 4:
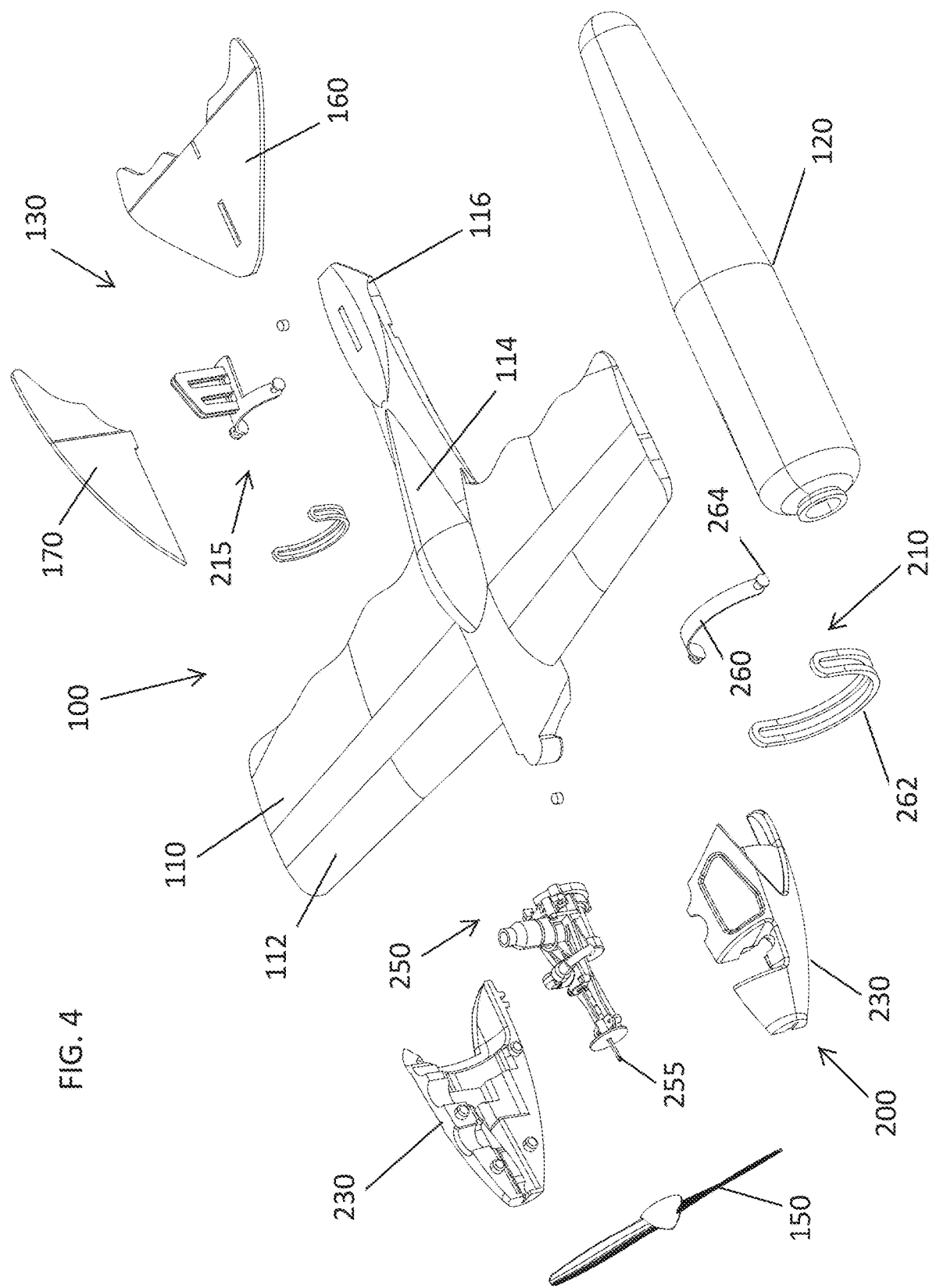
FIG. 4 is a partial exploded view of the flying toy.

FIG. 4 is an exploded view of a flying toy 100. This shows the nose section 200 as a two-piece nose section 230 that would encapsulate the motor assembly 250, which includes a shaft 255 for spinning the propeller 150. The wing section 110 includes wings 112, cockpit 114 and a portion of the tail 116. Further illustrated are the two fasteners 210 and 215 which secure around the canister 120. Each fastener includes a u-shaped connector 260 and an elastic connector 262. The elastic connector secures in a stretched state around the canister and has looped ends that secure around knobs 264 on the ends of the u-shaped connector 260. The tail assembly 130 is further discussed herein.

Figure 5B:
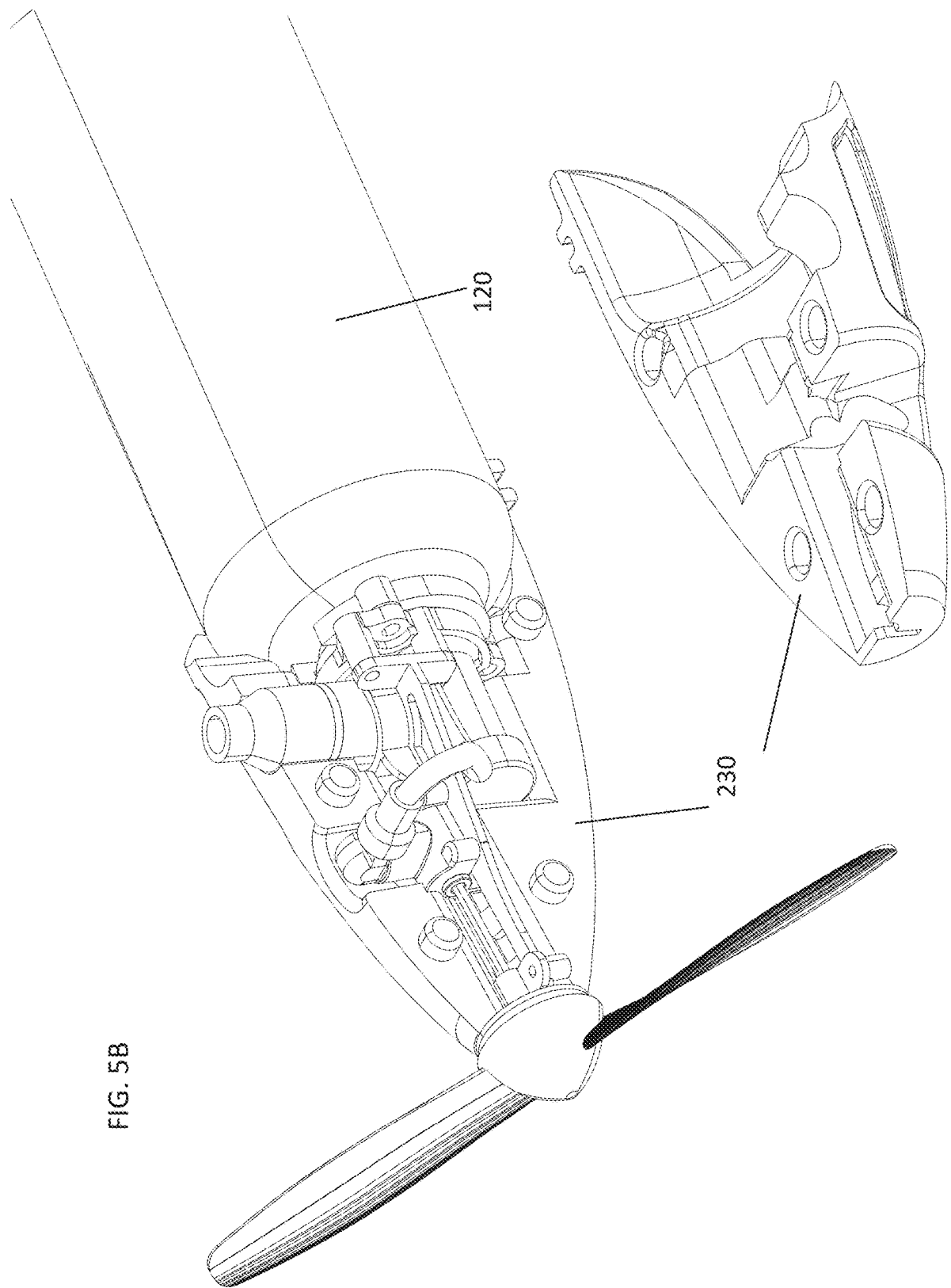

FIG. 5 is an enlarged view of the nose section 230 showing a pump inlet 300 and a flexible tube 310 that leads from an exit opening 312 in the manifold allowing compressed air to flow into the motor. The shaft 255 is also shown and is spun by the motor to turn the propeller.

Figure 6:
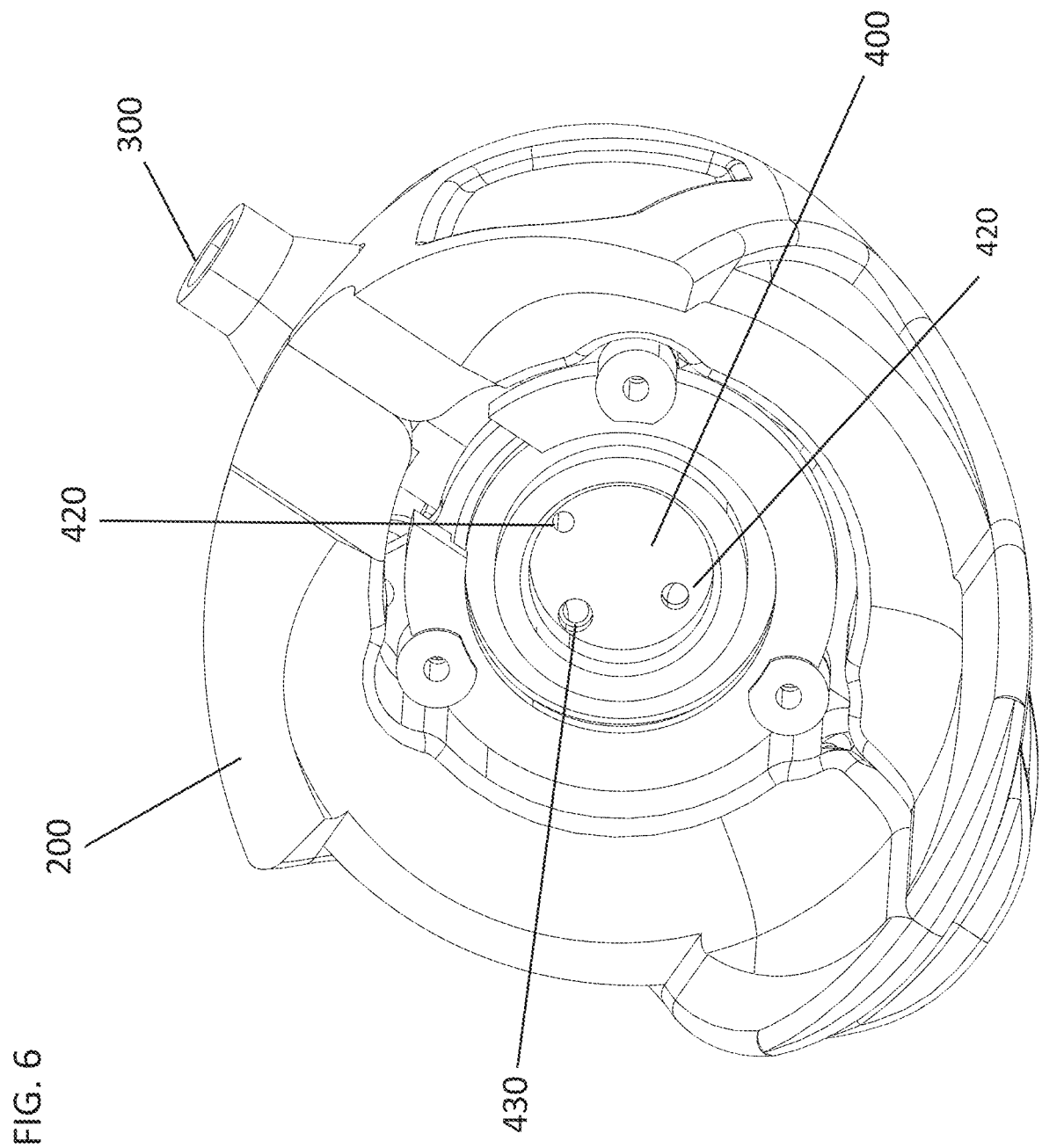
FIG. 6 shows manifold end showing openings into and exiting the manifold.

FIG. 6 shows the nose section 200 and the manifold 400 showing various openings. A first opening 420 or inlet to allow air from the pump to enter into the canister (via a one-way inlet valve), a second opening 430 or exit that connects by a flexible tube 310 to a pneumatic motor (via a one-way outlet valve), and a third opening 440 that connects to a pressure release valve. The pressure release valve avoids over pressuring the canister.

Figure 7:
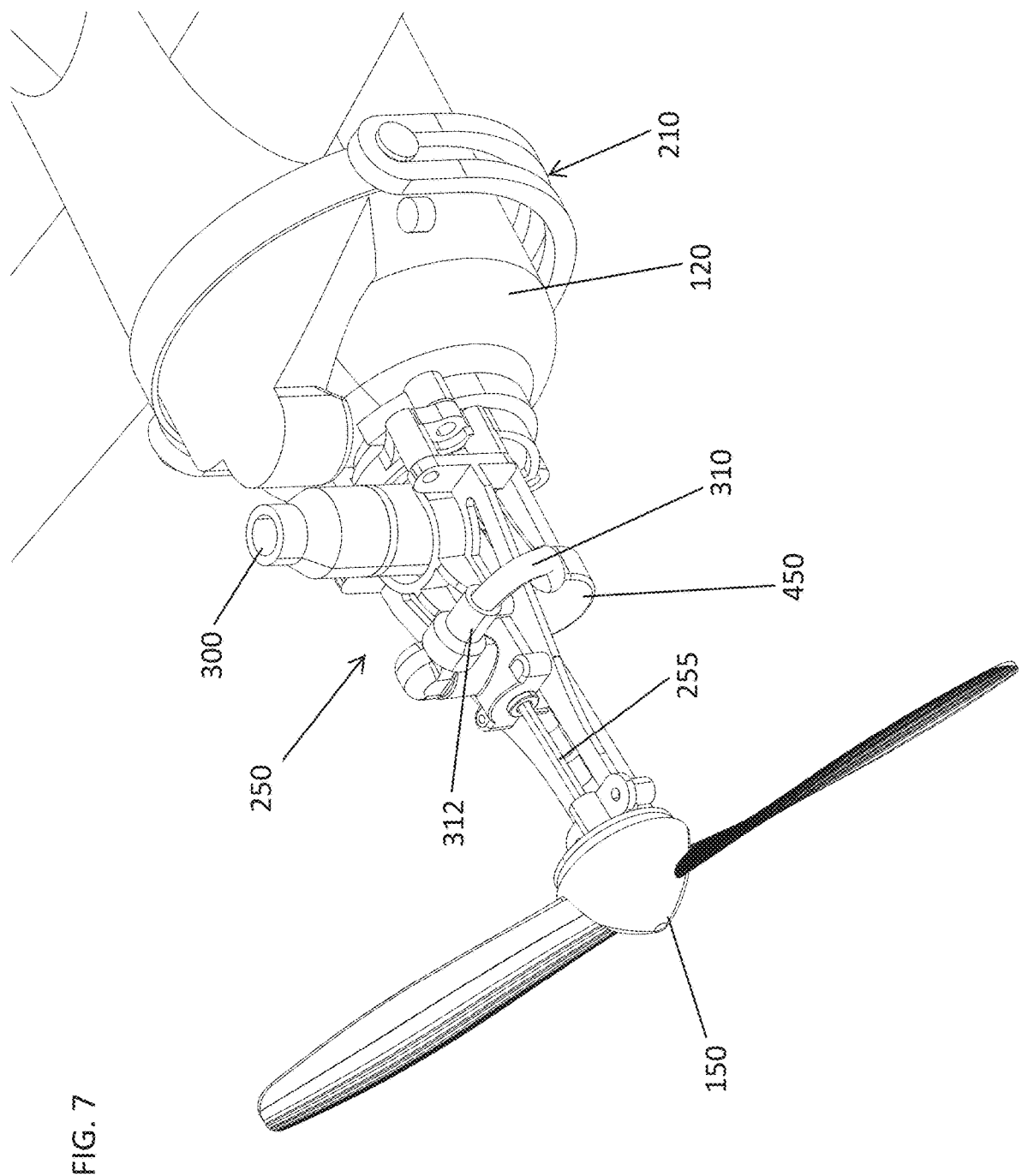
FIGS. 7 and 8 show the motor assembly secured to the canister and propeller.
Figure 8:
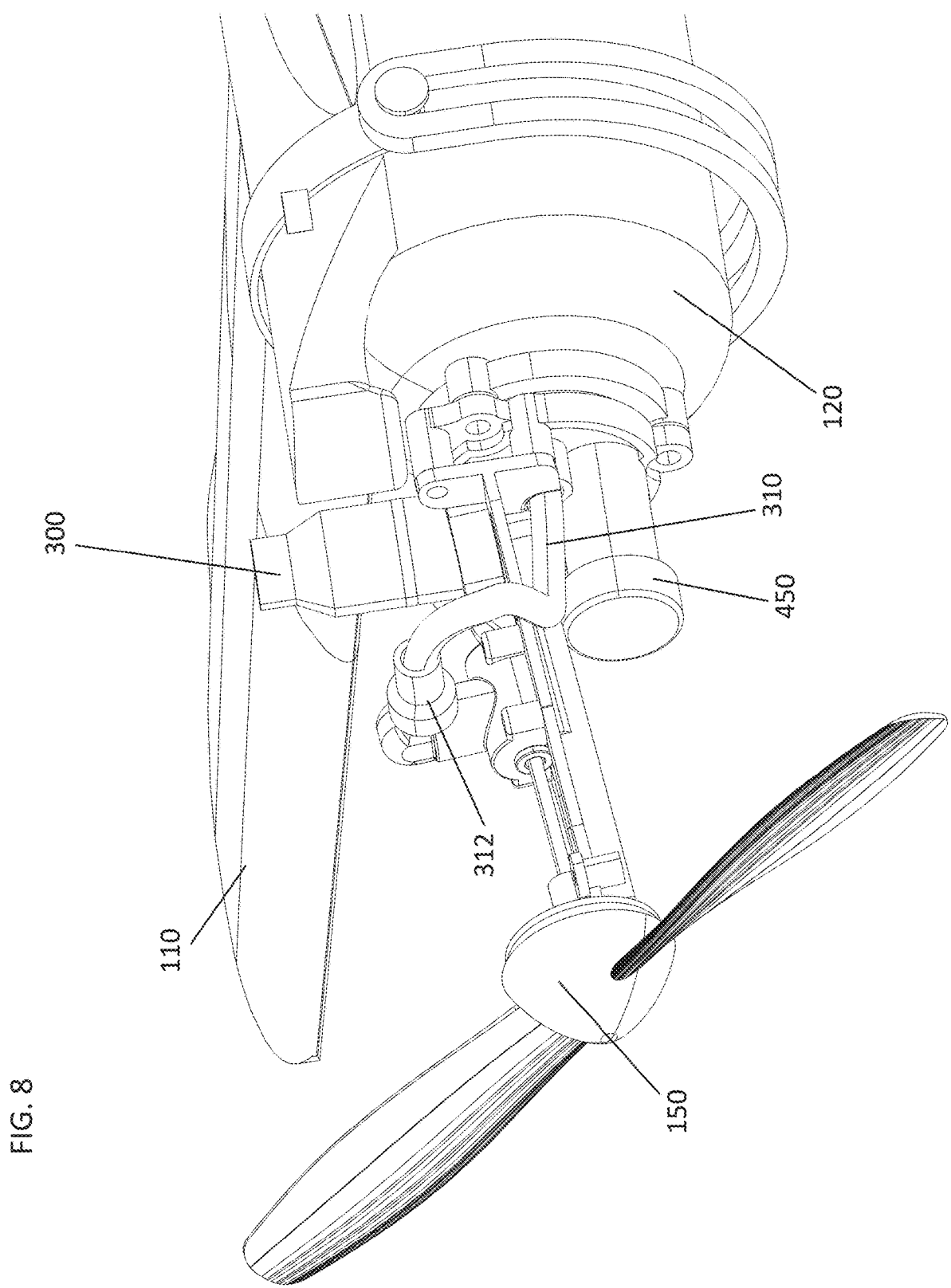
Figure 9:
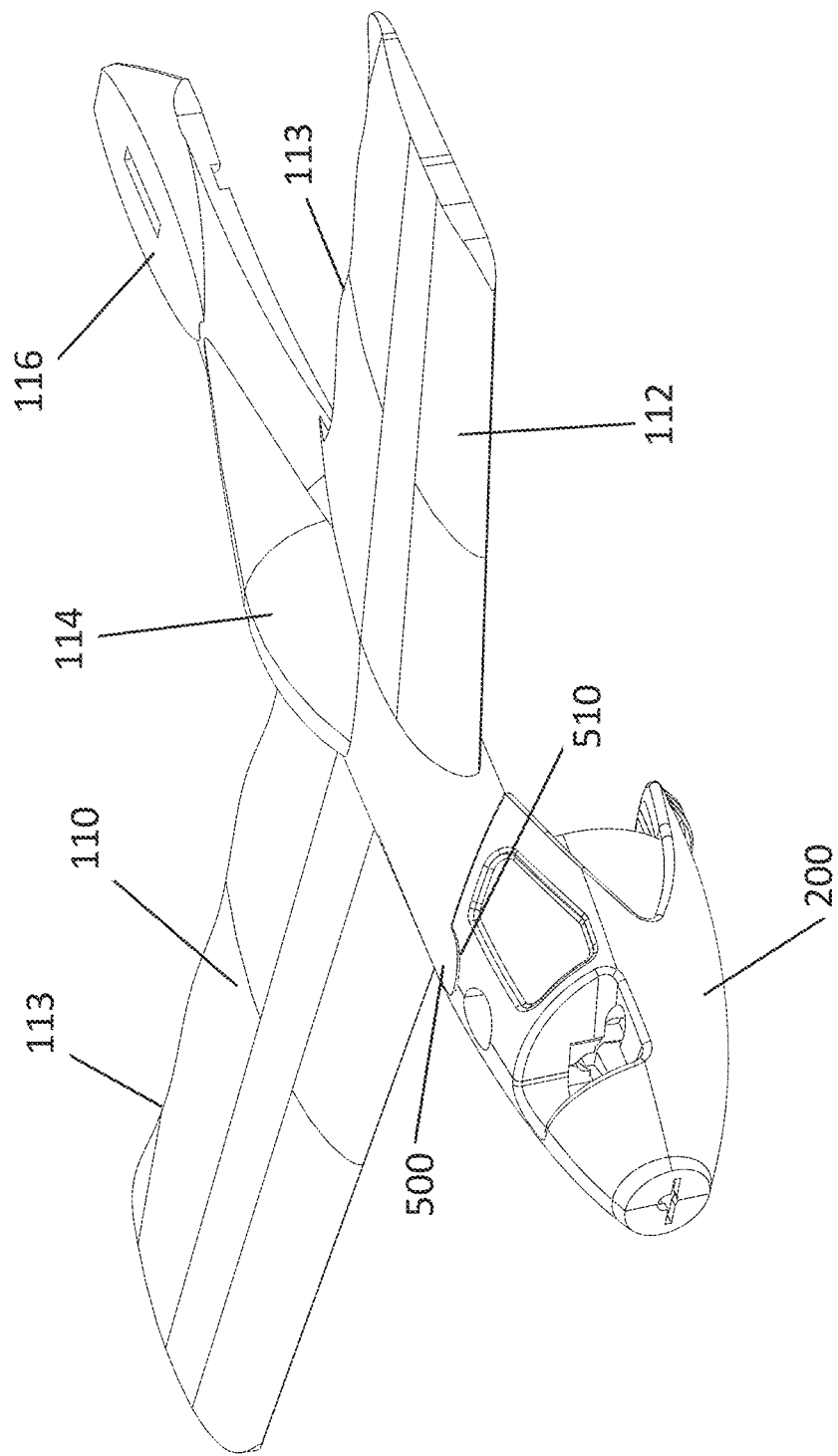
FIGS. 9-13 illustrate carious aspects of the wing assembly and nose section.
Figure 10:
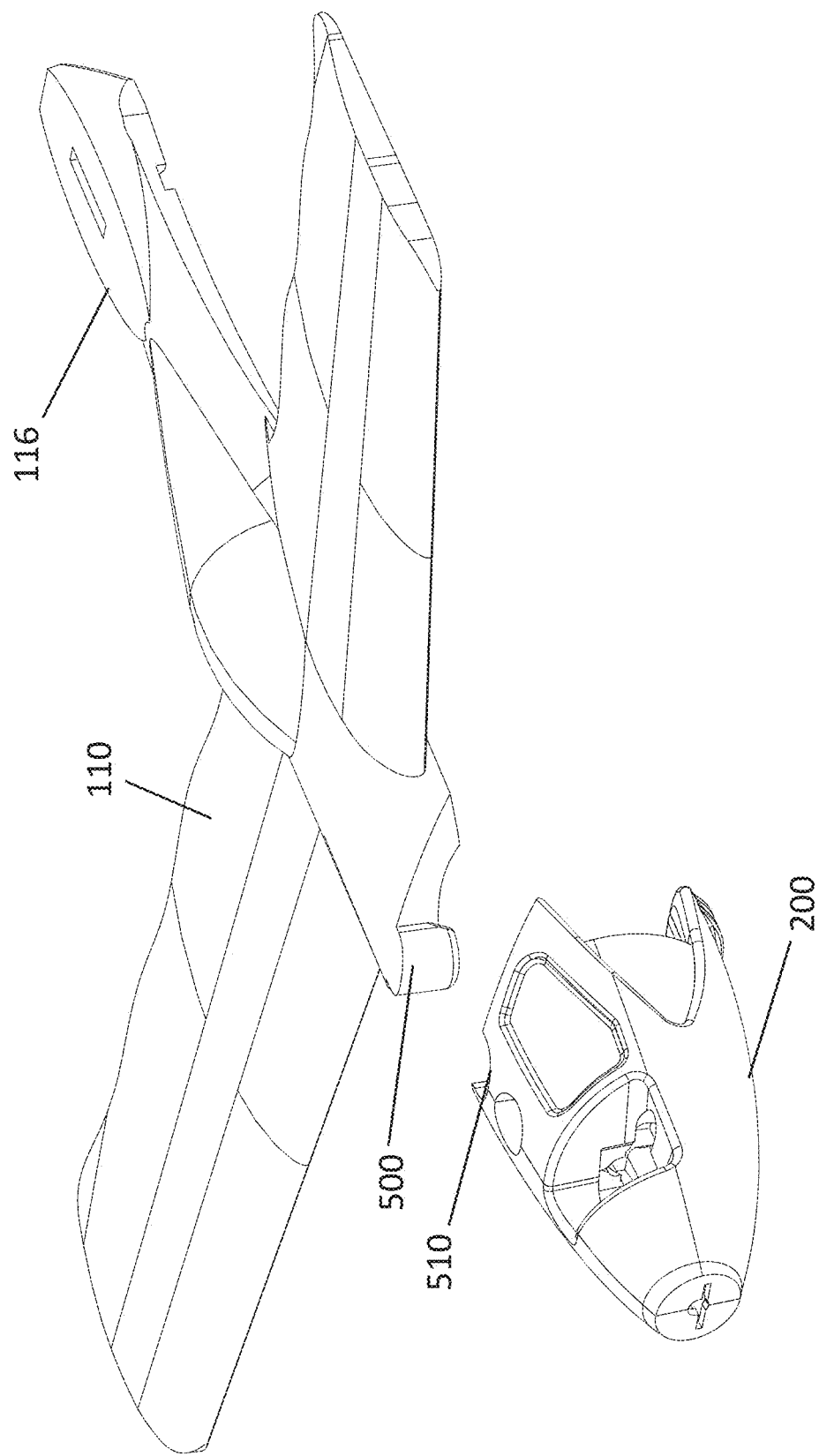
Figure 11:
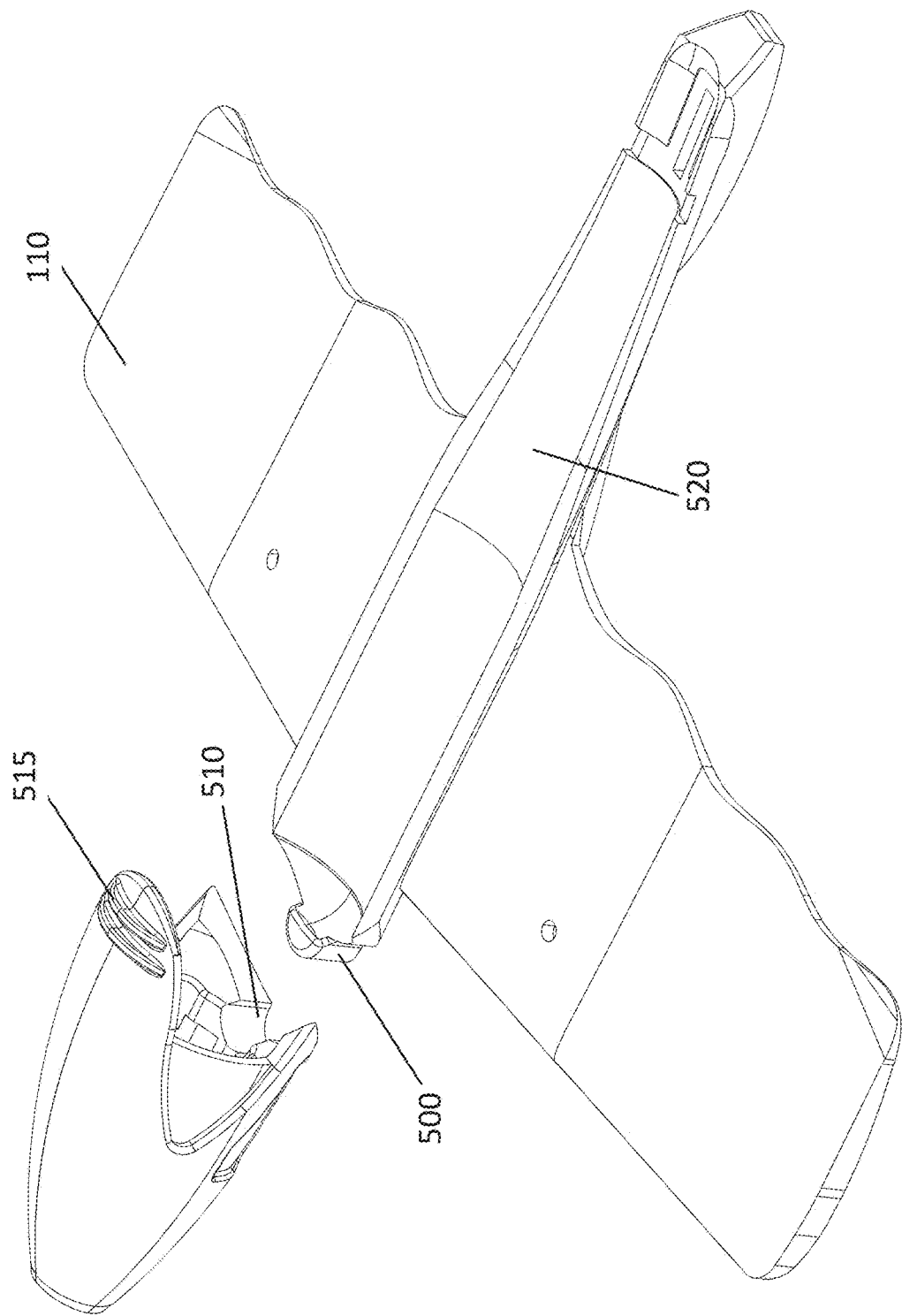
Figure 12:
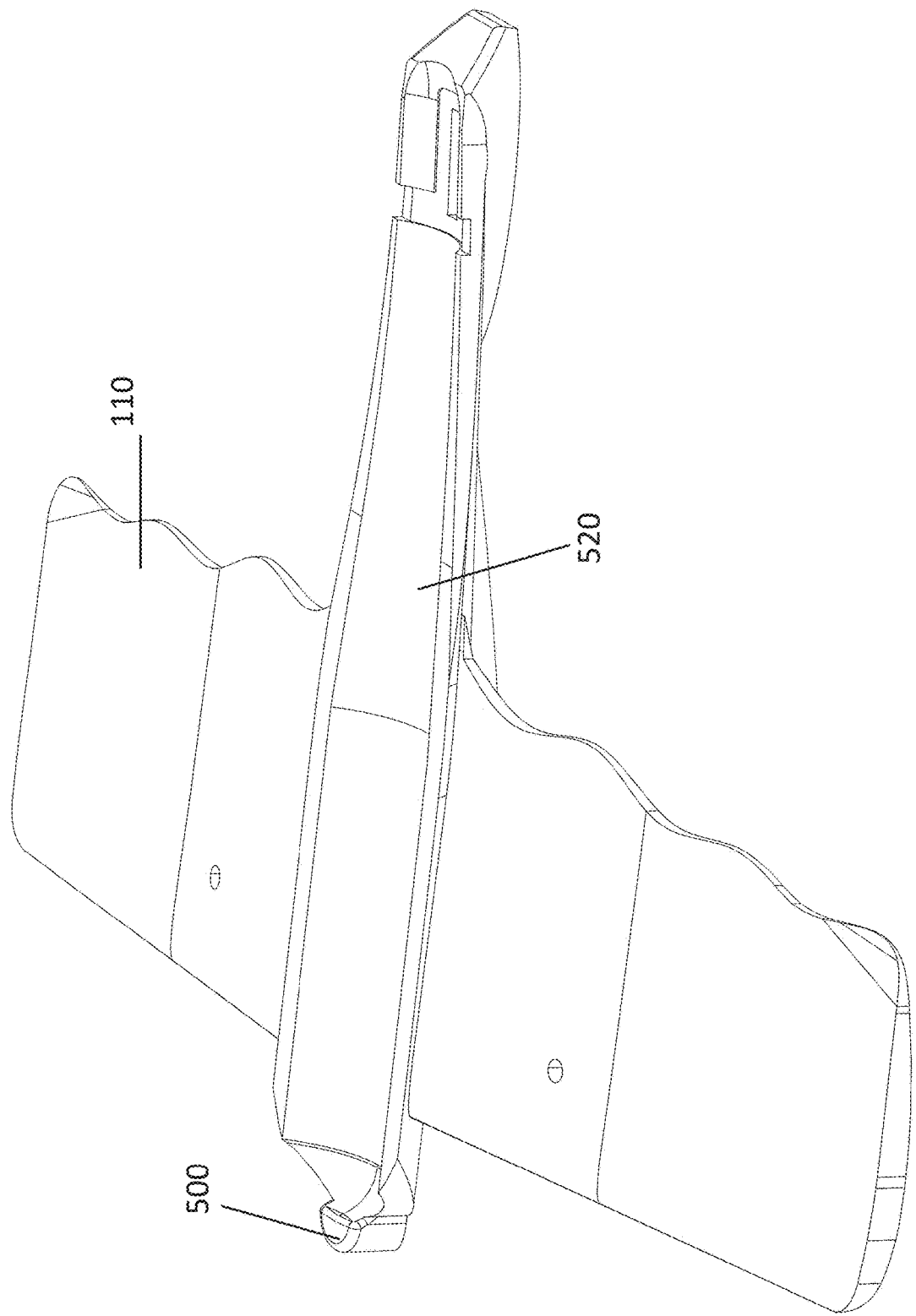
Figure 13:
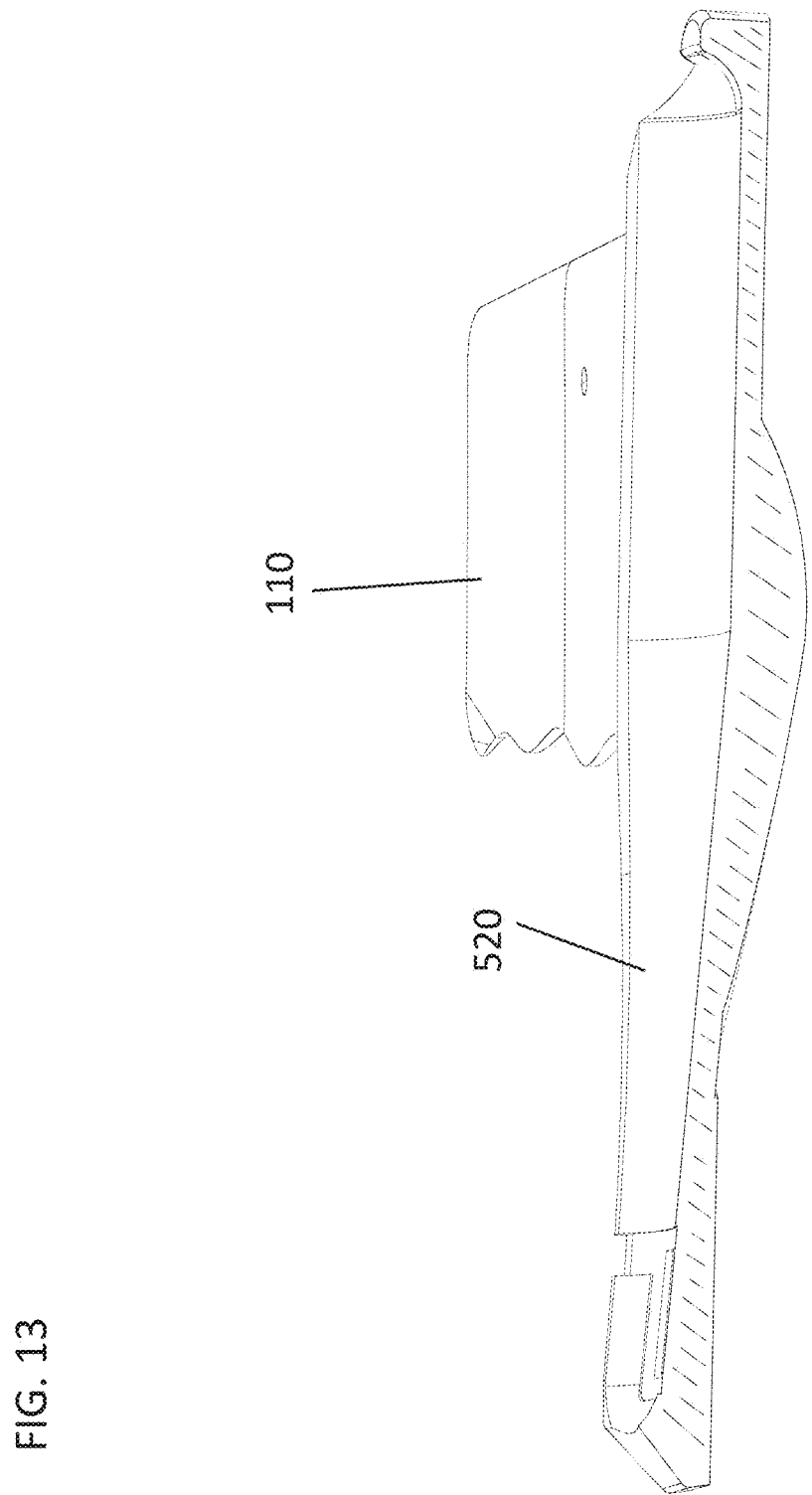
Figure 14:
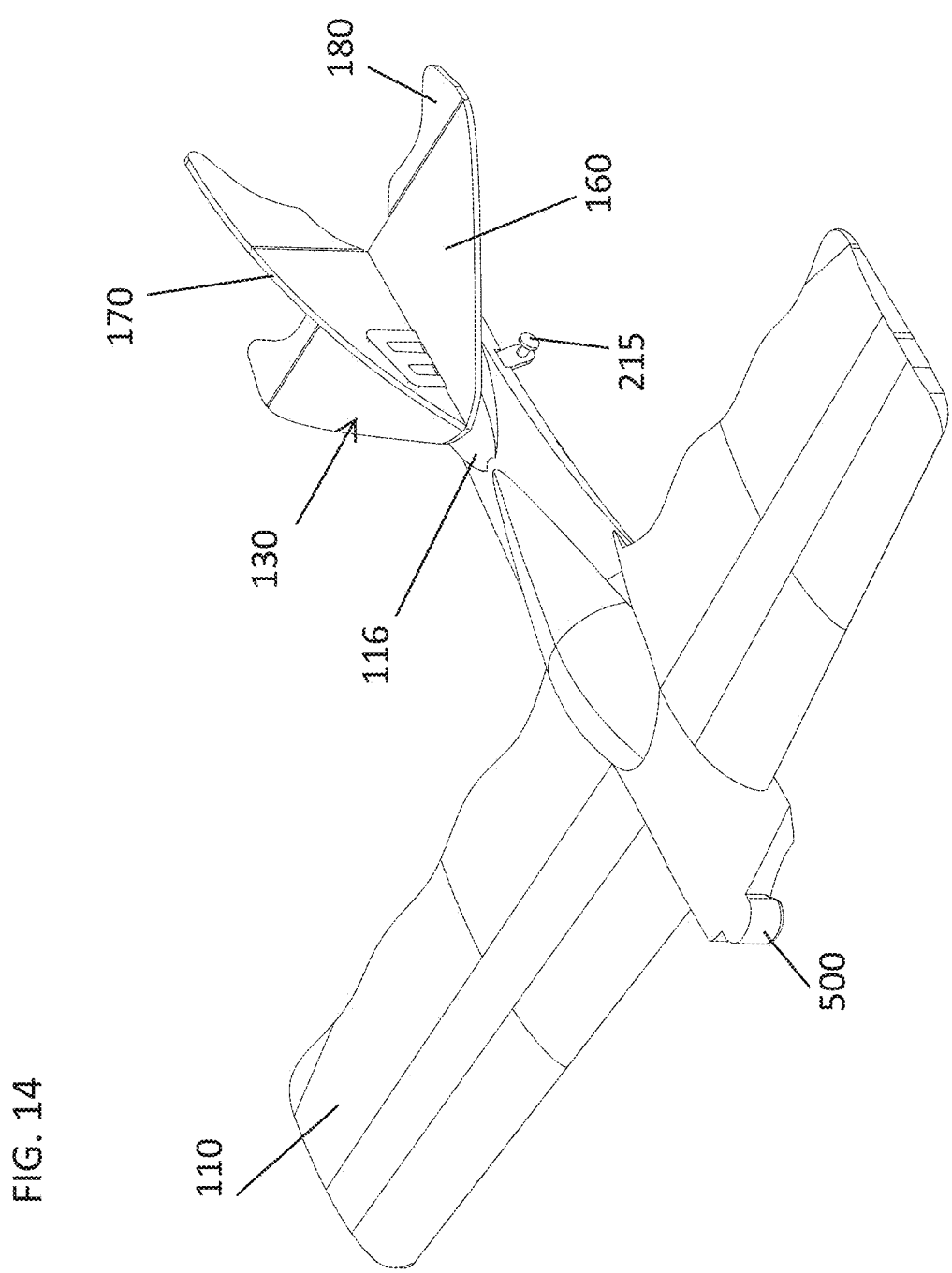
FIGS. 14-17 illustrate the tail assembly attachment to the wing assembly.
Figure 15:
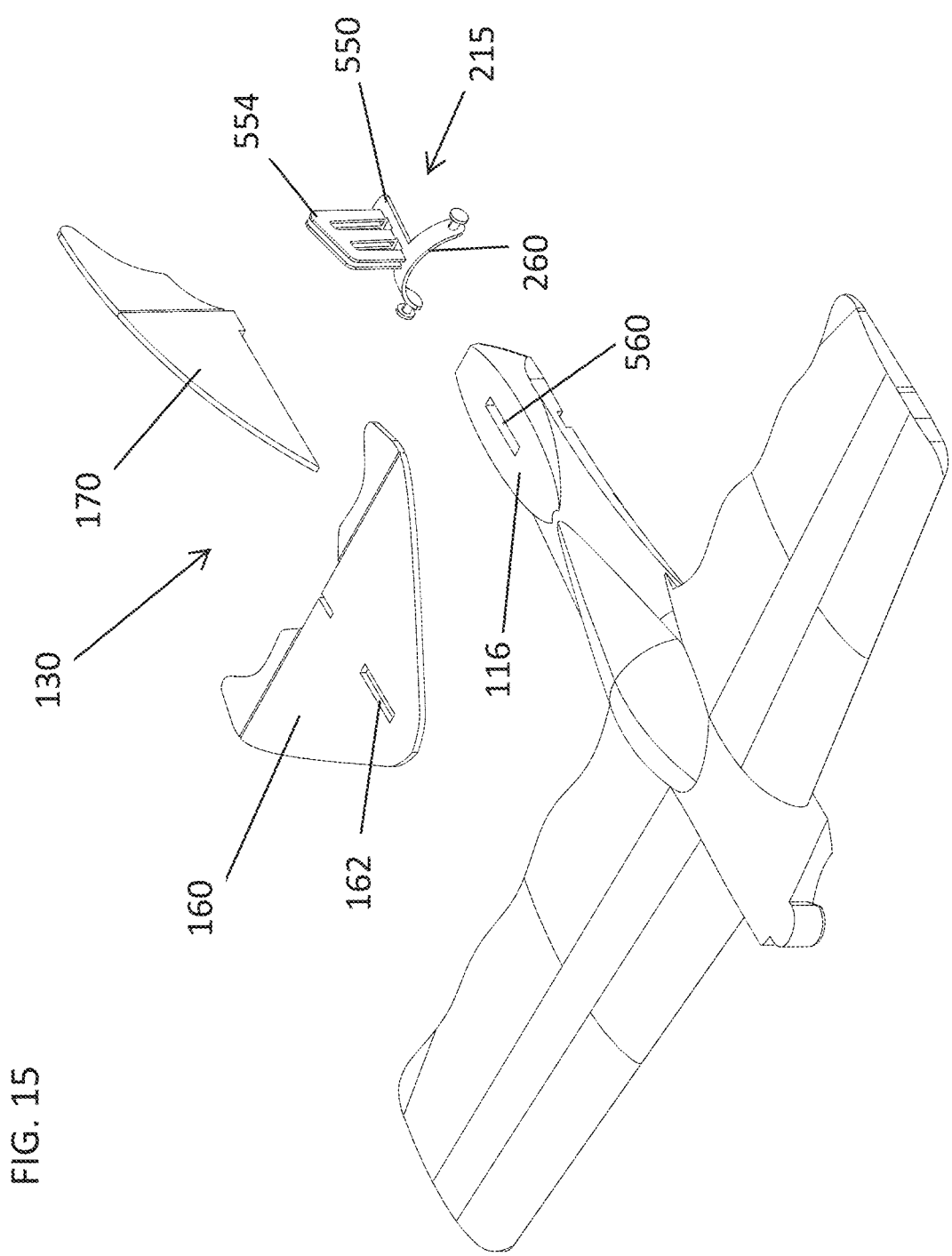
Figure 16:
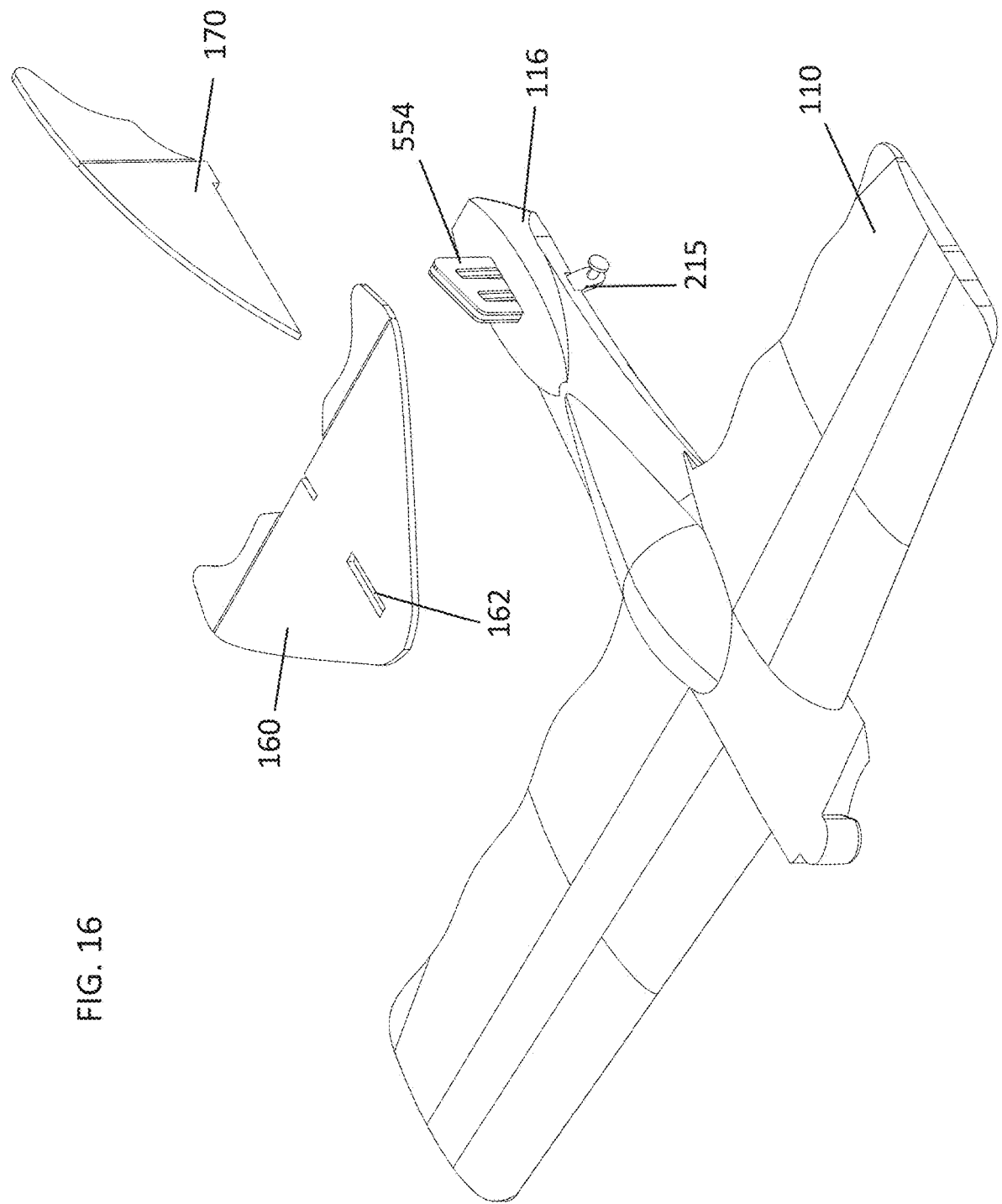
Figure 17:
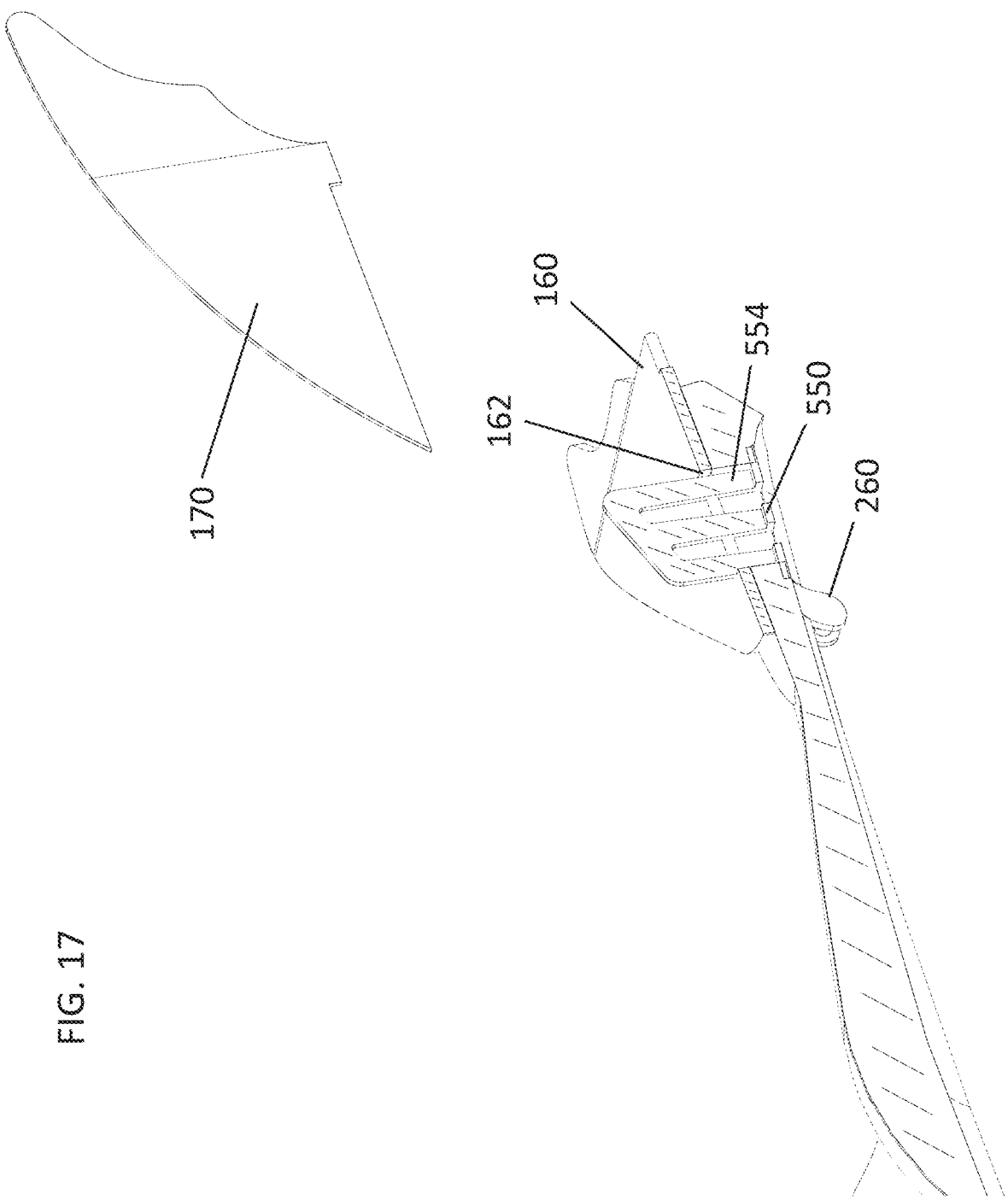
Figure 18:
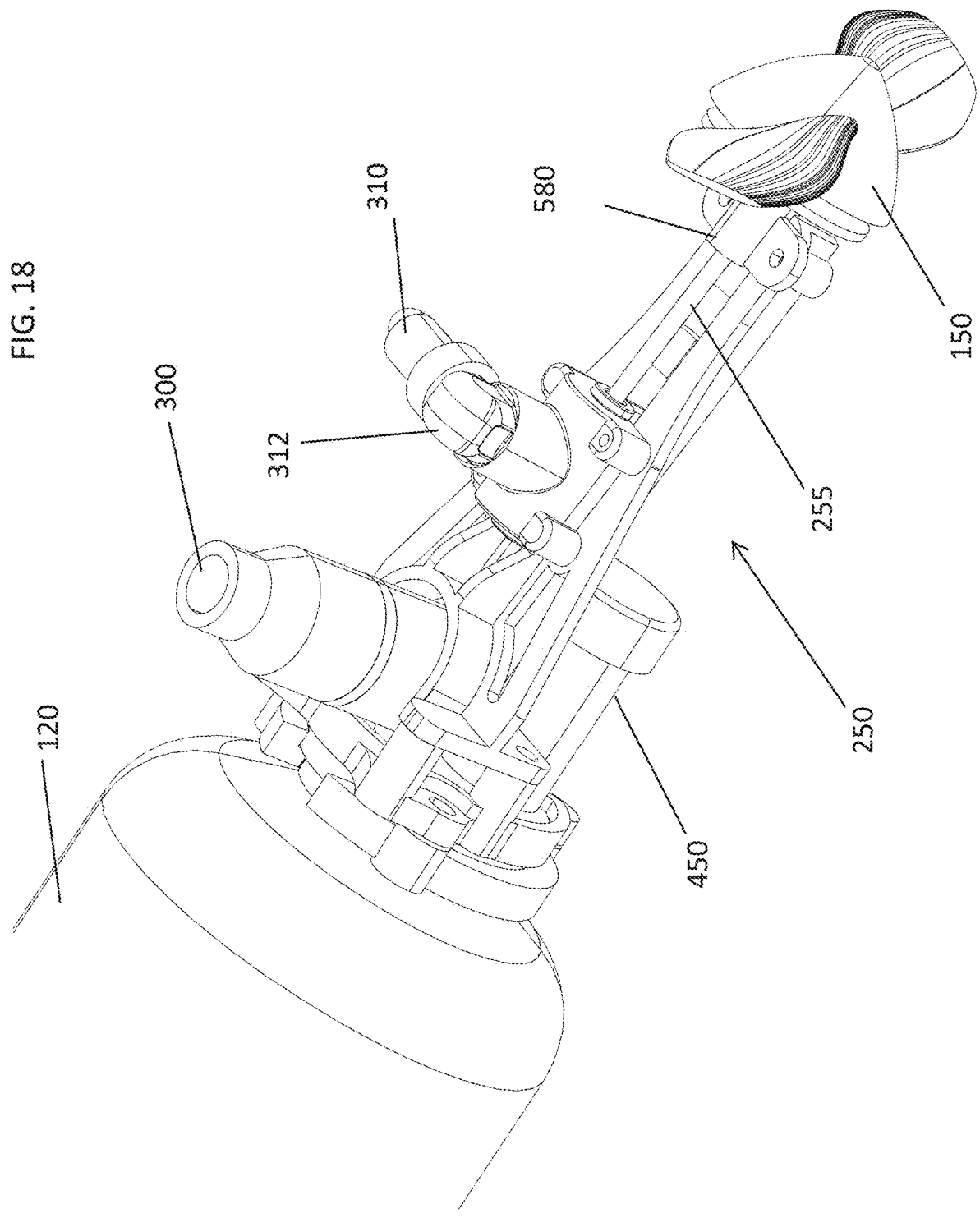
FIGS. 18-23 illustrate the motor assembly in accordance with an embodiment of the invention.
Figure 19:
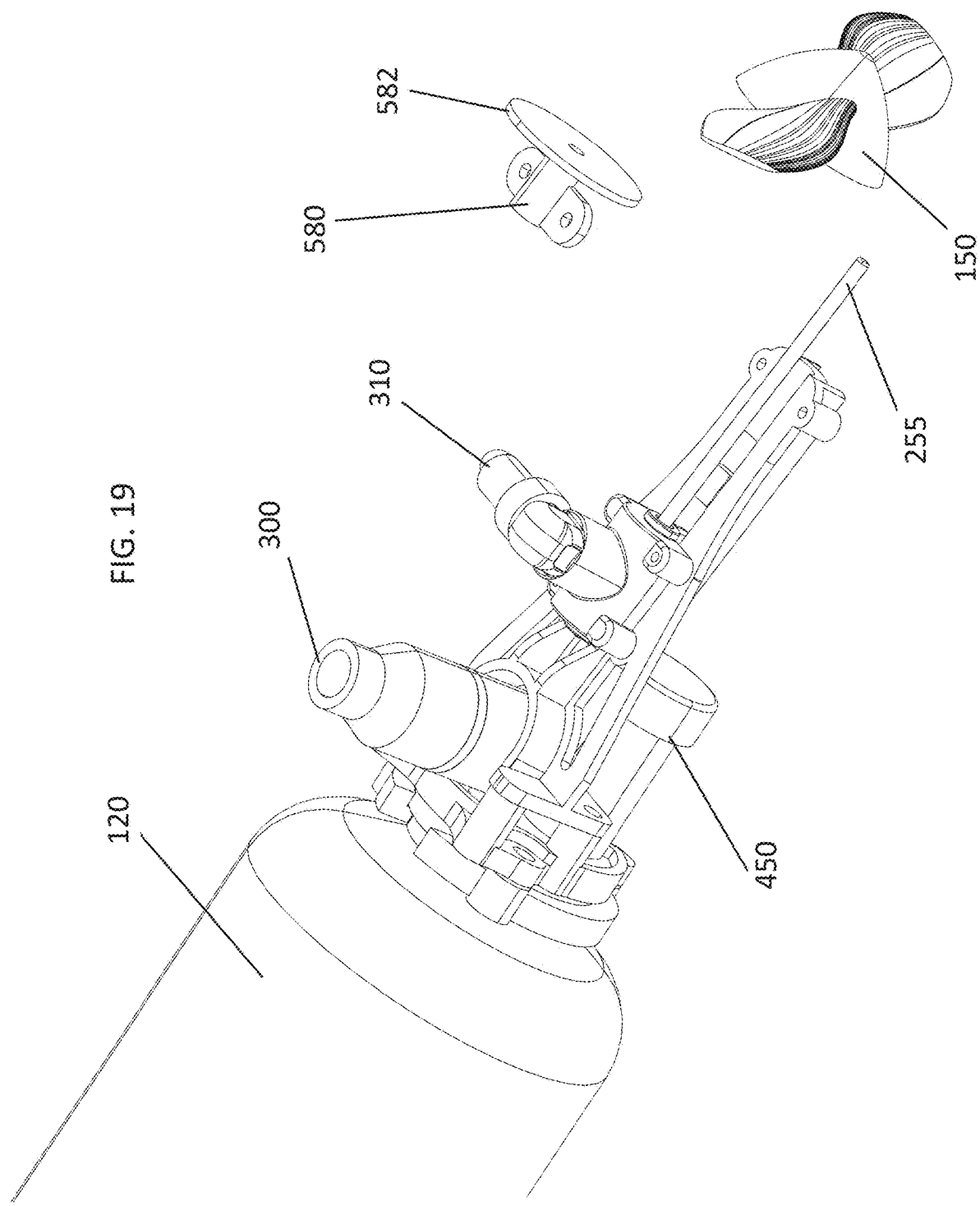
Figure 20:
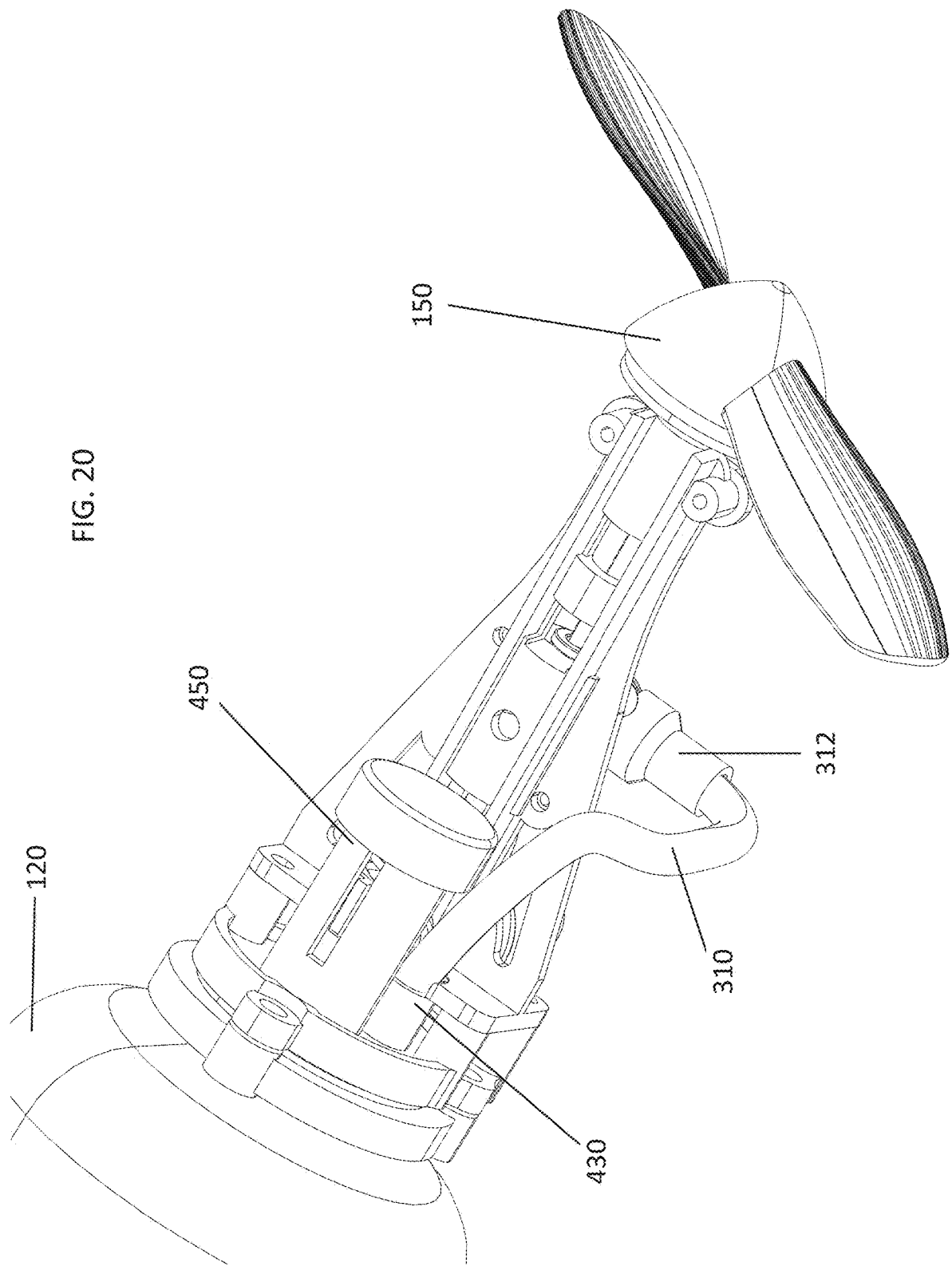

FIGS. 7 and 8 shows the motor assembly 250 with the pump unlet 300, the flexible tube 310 and the shaft 255 leading to the propeller 150. The pressure release valve 450 is also shown.

FIGS. 9-15 shows the wing assembly 110 connected to the nose section 200 with the forward tab 500 that is situated into a curved opening 510 created by the nose section 200. In addition, the wing assembly 110 includes a tail base 116 situated for connection to the tail assembly. The wing assembly 110 further includes a pair of wings 112 that include scalloped trailing edges 113 designed to help with the flight conditions. As described above, if after flight the wing assembly separates form the nose section, the use can simply align the forward tab against the curved opening and press the two section together to re-assembly. Making assembly easy.

In addition, the underside of the nose section 200 may include curved channel created by a pair of tabs 515 situated to receive and better align the forward fastener 210. The underside of the wing assembly may include a curved or indented fuselage profile 520 to receive and align the canister in a proper position. As noted above, the canister may be tapered towards the rear portion to provide better flight characteristics and decrease deformation during crashes. Thus, the indented fuselage profile 520 shows a deeper curve towards the front end as opposed to the rear end to accommodate for the tapering.

FIGS. 14-17 show a wing assembly 110 connected to a tail assembly 130. The tail assembly 130 includes horizontal stabilizers 160 and a vertical stabilizer 170 with bendable rudders 180 to allow various flight patterns. The tail assembly 130 is secured to the tail base 116, of the wing assembly 110, by the aid of the rear fastener 215. The rear fastener 215 includes a curved flange 260 that sits under a tail base 116.

The rear fastener 215 further includes a base support 550 extending from the curved flange 260 and a pair of vertical clips 554 extend upwardly from the base support 550. When the curved flange 260 is situated under the tail base 116, the vertical clips 554 extend through a slot 560 in the tail base 116 and through a slot 162 in the horizontal stabilizer 160. The pair of vertical clips 554 are slightly spaced apart to receive a portion of the horizontal stabilizer 170, securing it to the tail assembly 130.

FIG. 18-23 show the motor assembly 250 with the pump inlet 300, the pressure release valve 450, the shaft 255 that is spun by the motor to rotate the propeller 150. The shaft 255 is held in a free rotation and in place by an axle bushing support 580 that also is positioned against the propeller 150. The axle bushing support 580 includes a front face plate 582 that rests against the inside face of the propeller to assist in maintaining a smooth rotation.

Figure 21:
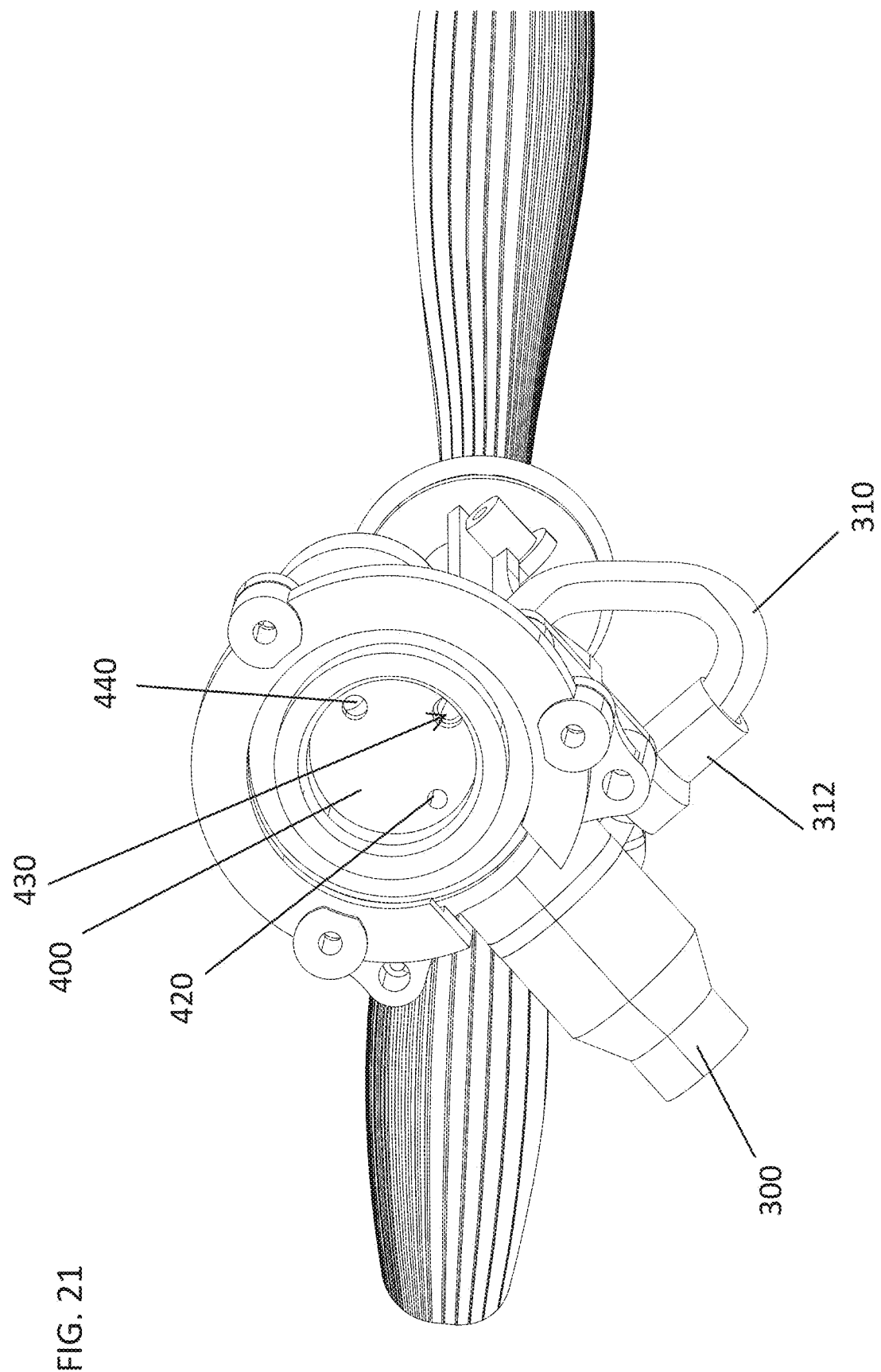

FIG. 21 shows the manifold 400 with the first opening 420 or inlet to allow air from the pump to enter into the canister (via a one-way inlet valve), a second opening 430 or exit that connects by a flexible tube 310 to a pneumatic motor (via a one-way outlet valve), and a third opening 440 that connects to a pressure release valve. The pressure release valve avoids over pressuring the canister.

Figure 22:
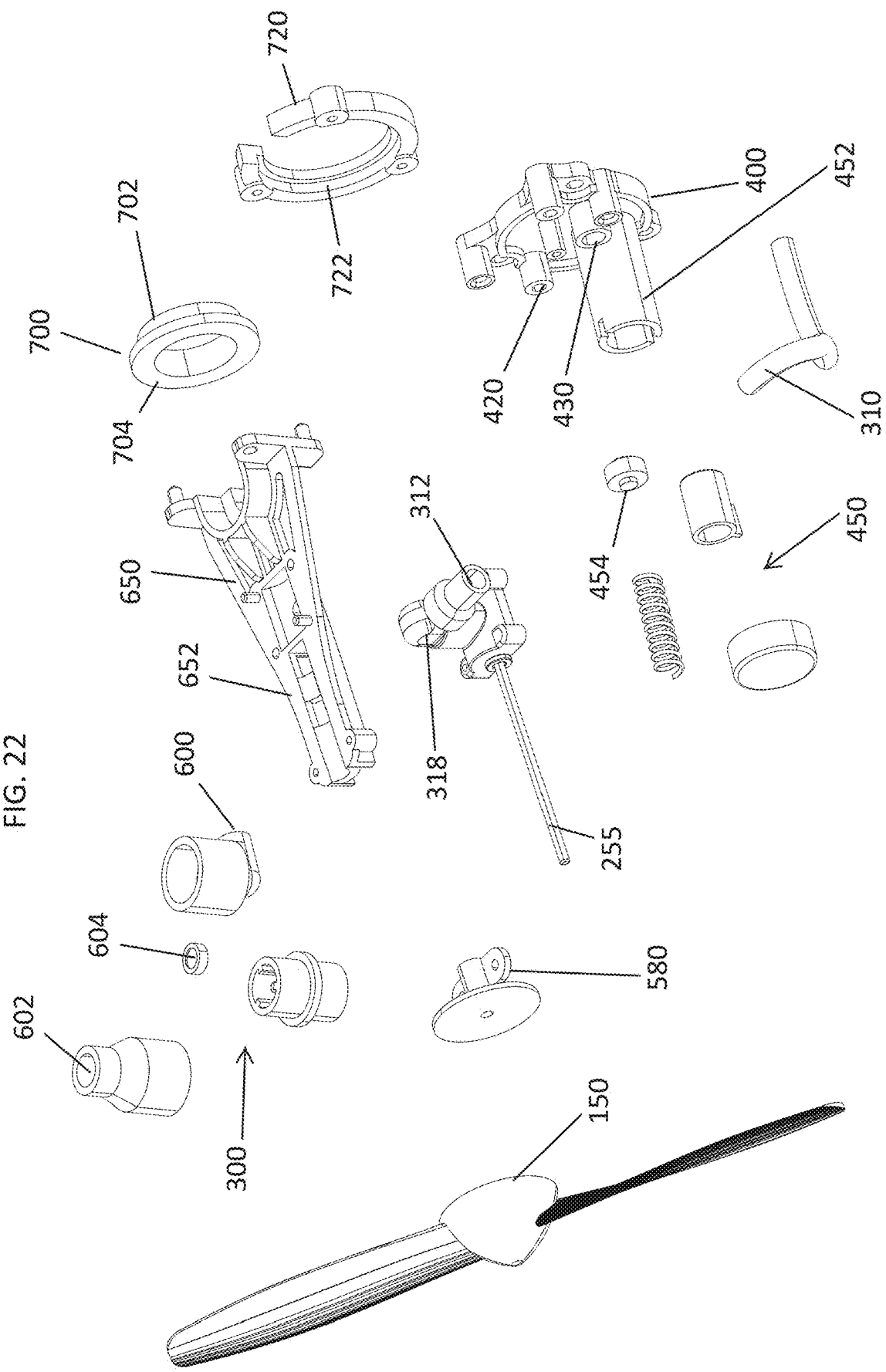
Figure 23:
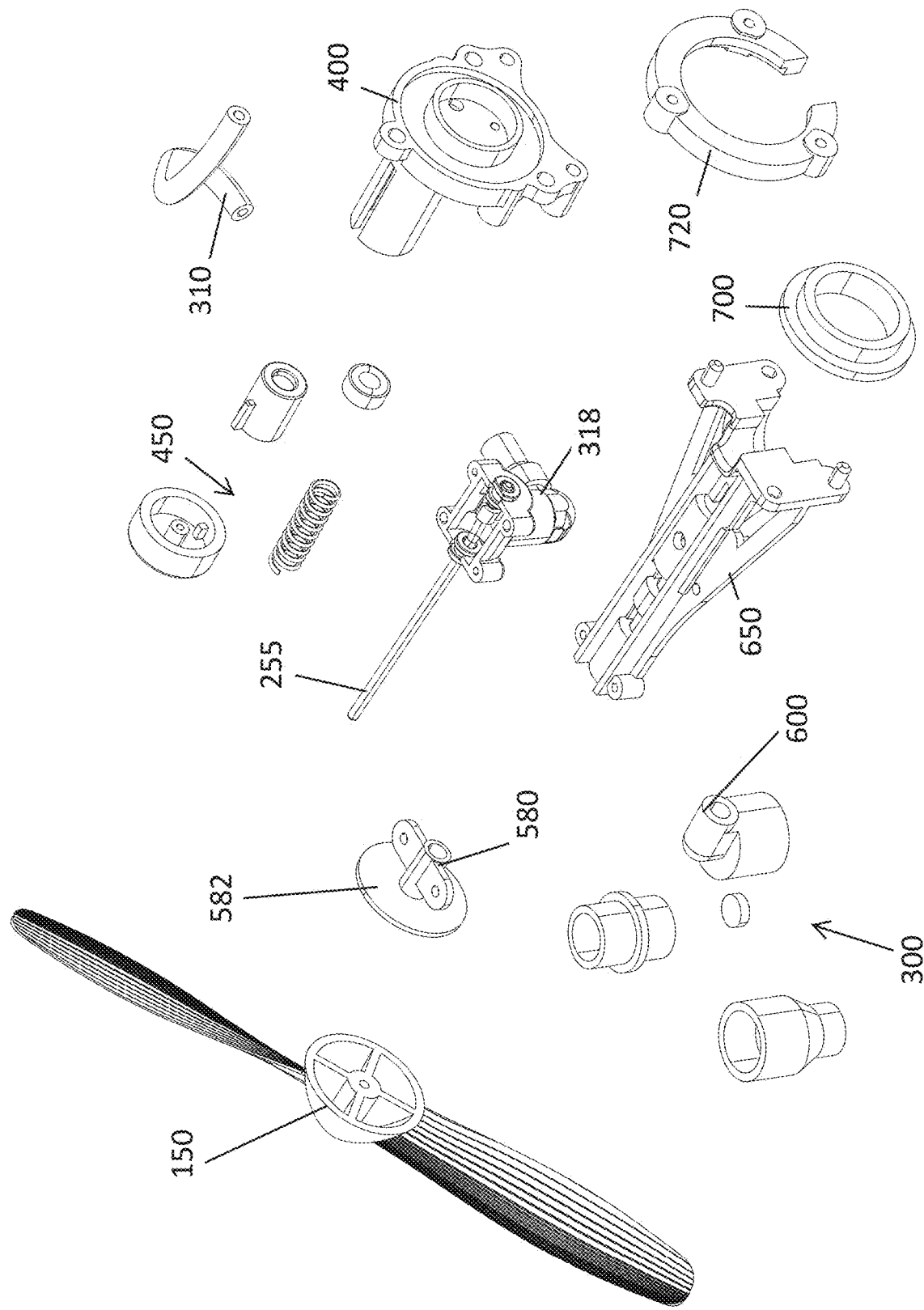
Figure 24:
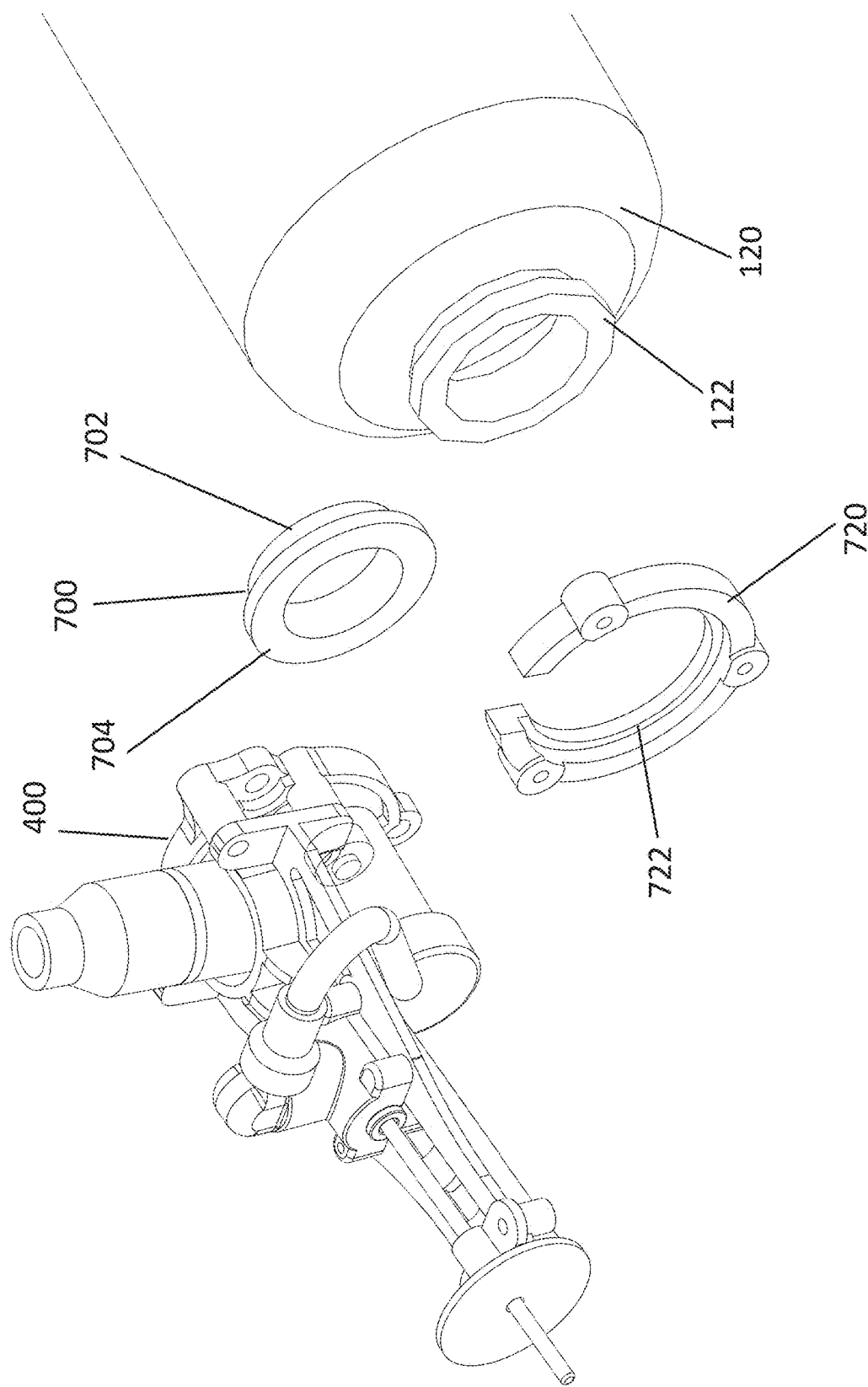
Figure 26:
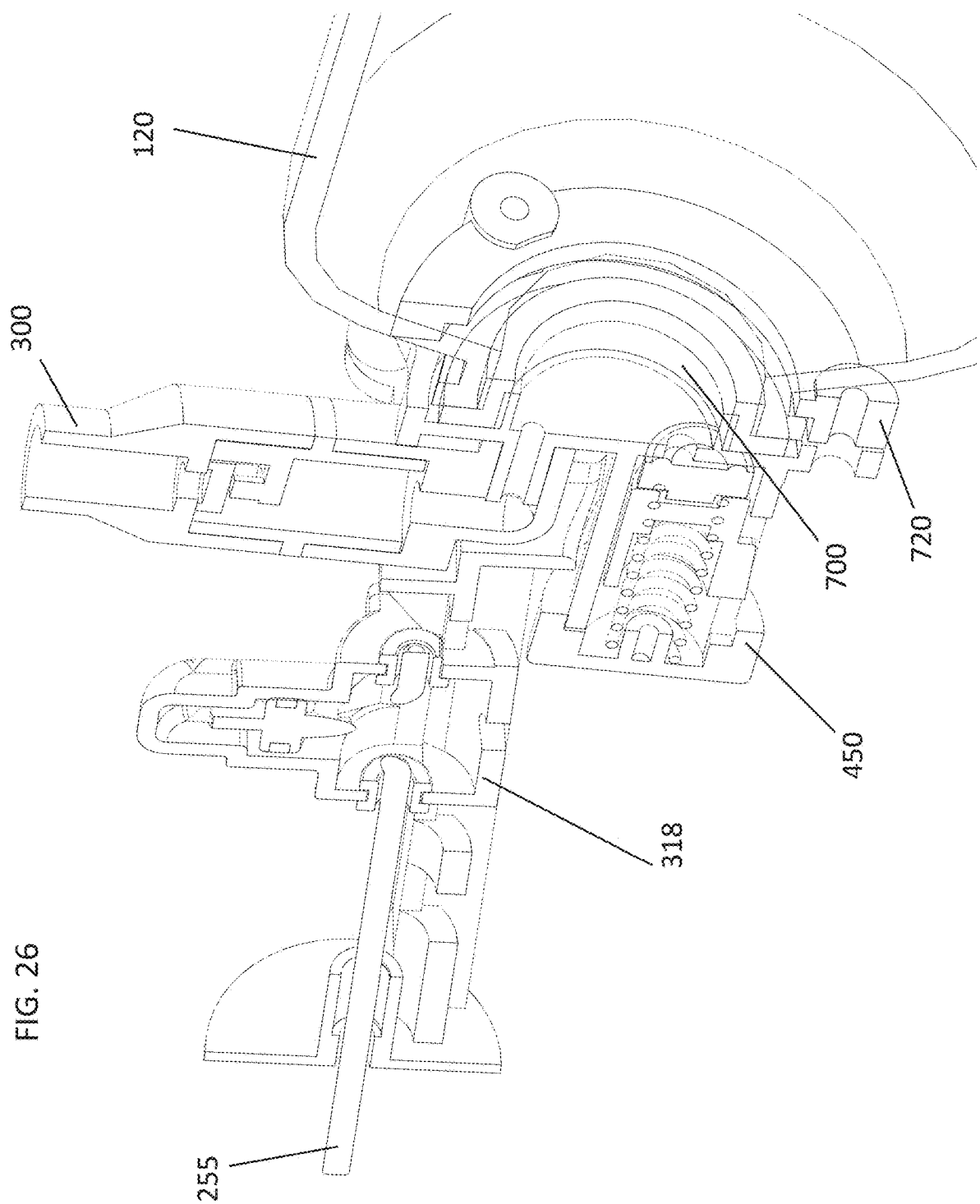
Figure 27:
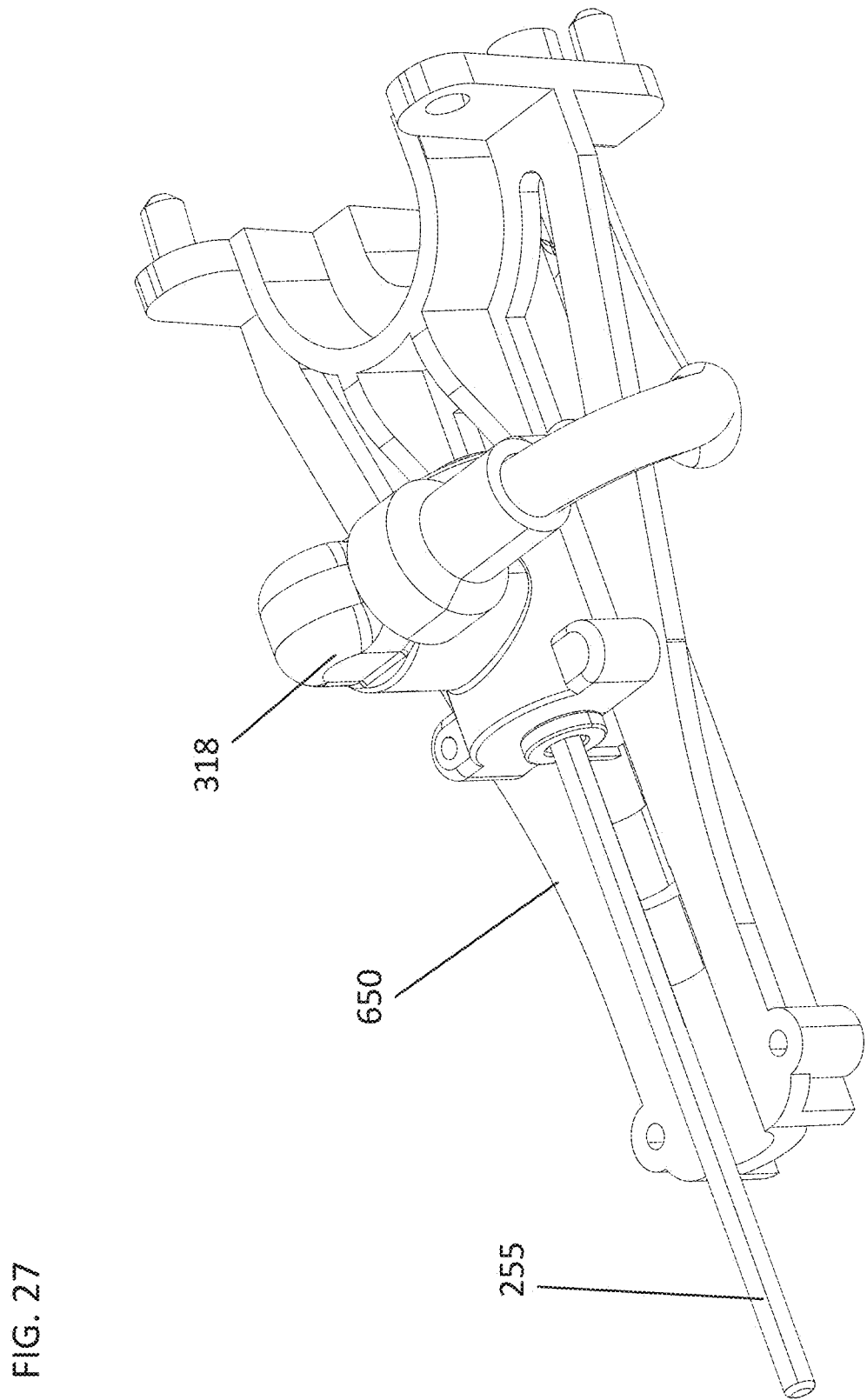
FIGS. 27-29 illustrate a motor platform and the motor secured thereto in accordance with an embodiment of the invention.
Figure 28:
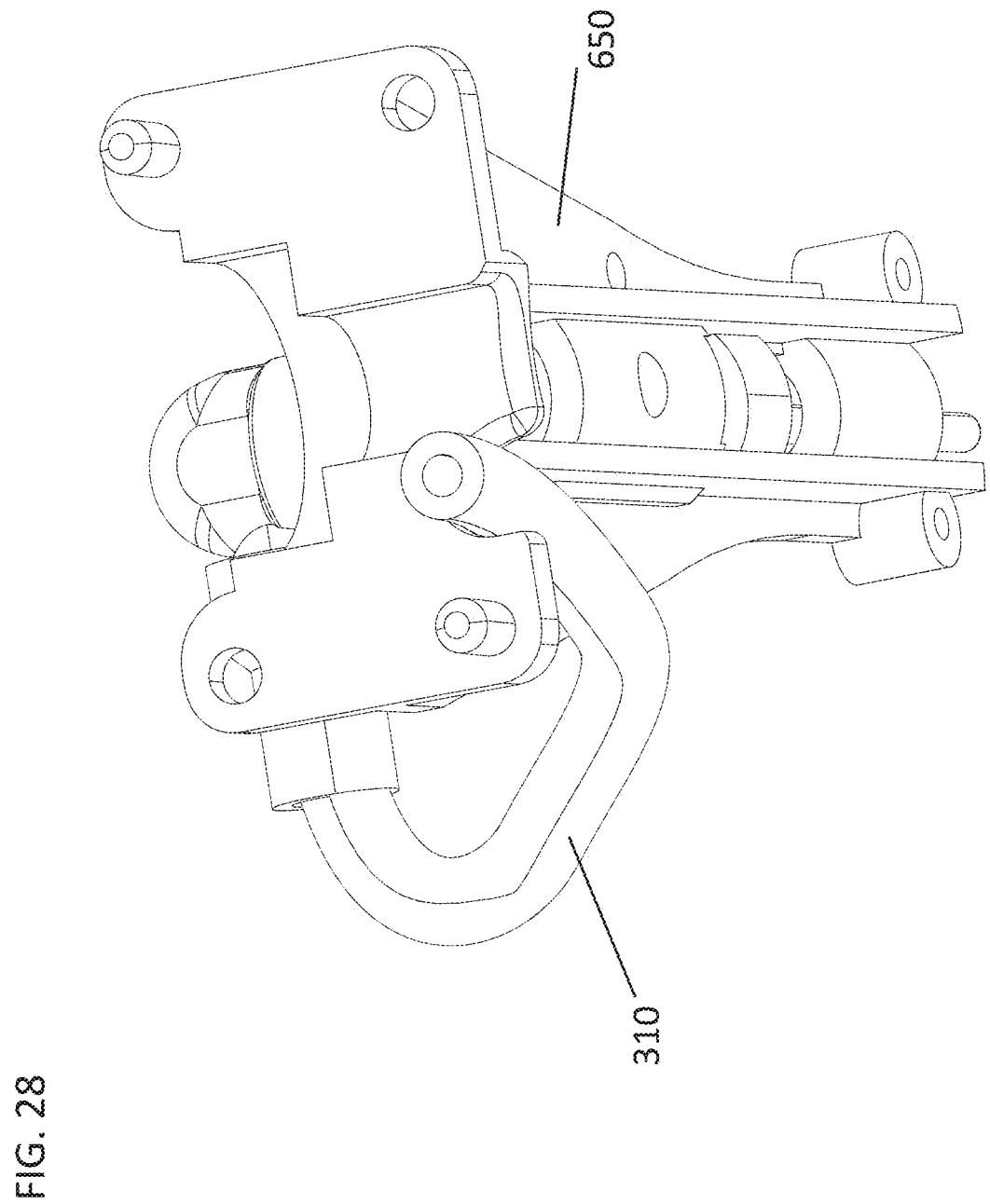
Figure 29:
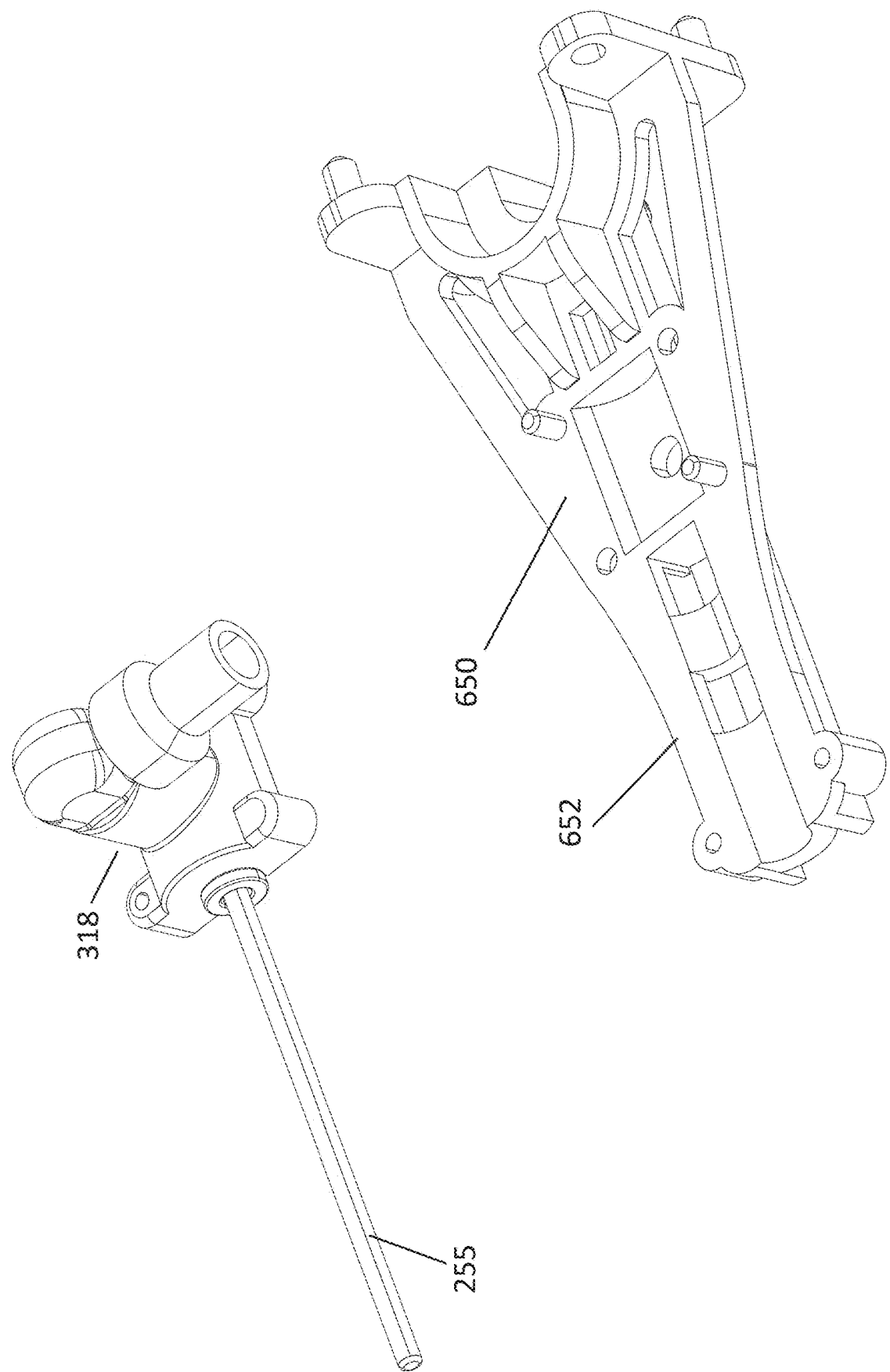

FIG. 22 shows an exploded view of the motor assembly. The pump inlet 300 includes an intake opening 602 with a one-way valve 602 and a pump outlet 600 that connects into the first opening 420 in the manifold 400 to lead directly into the canister to pump and pressurize the air in the canister. The pressure release valve 450 includes a housing portion 452 in built into the manifold 400 and includes a one-way valve 454 that is configured to release pressure in the canister if over pumped. The flexible tube 310 connects the second opening 430 or exit from the canister to the inlet 312 of the pneumatic motor 318 (via a one-way outlet valve).

The motor 318 and manifold 400 are secured to a motor platform 650 that has an extended arm 652 to further secure the axle bushing support 580 thereto. The canister is pneumatically secured to the manifold 400 by the use of a seal 700 that includes an annual ring 702 that fits within the opening of the canister and a base ring 704 that presses against the manifold 400. A receptacle clip 720 includes an arcuate groove 722 facing towards the manifold, the clip 720 fits around a flange 122 that extends around the opening of the canister 120. The receptacle clip 720 is then secured against the manifold 400 trapping or securing the seal 700 in place.

Figure 30:
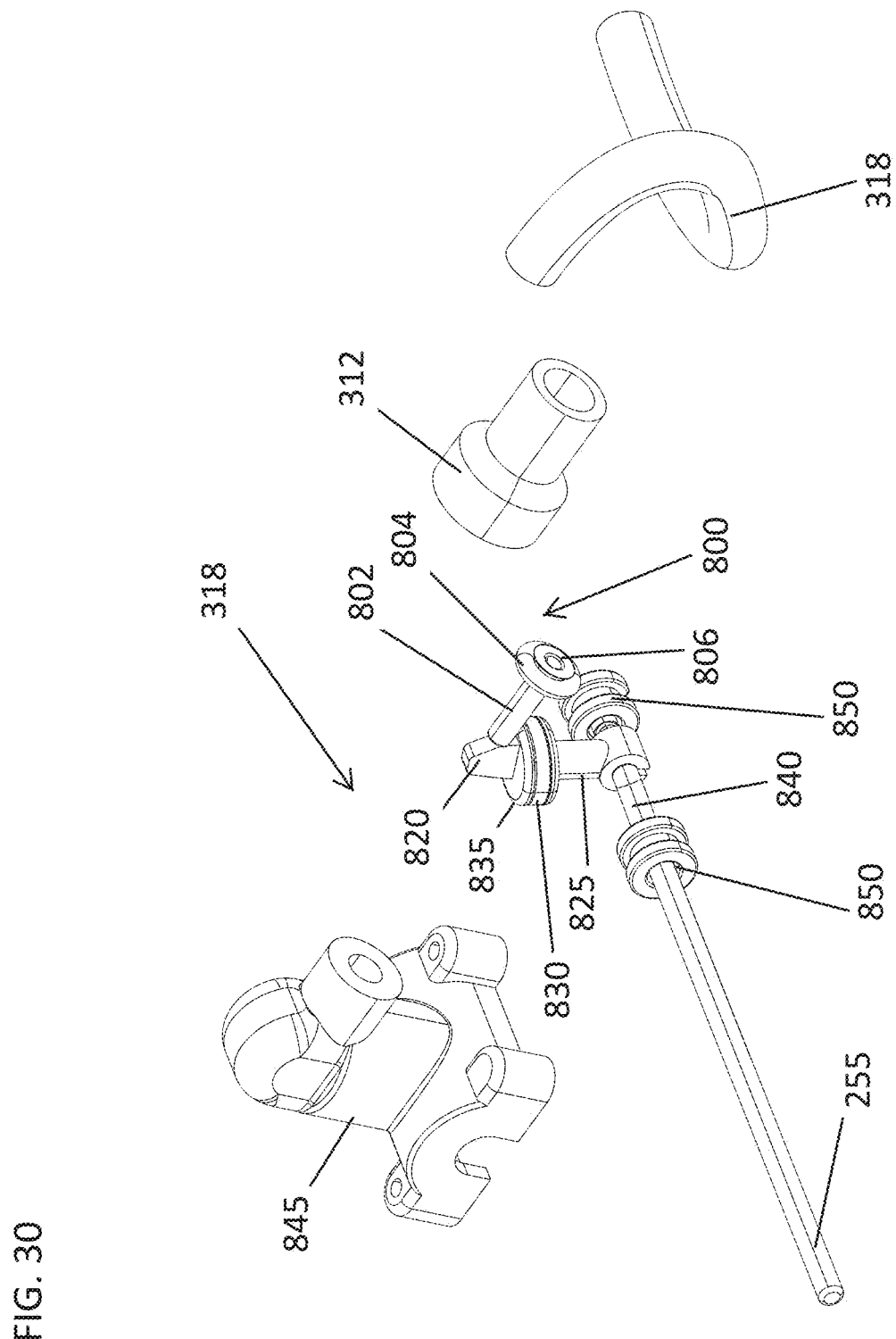
FIGS. 30-31 shows in an exploded view the components of the pneumatic motor.
Figure 31:
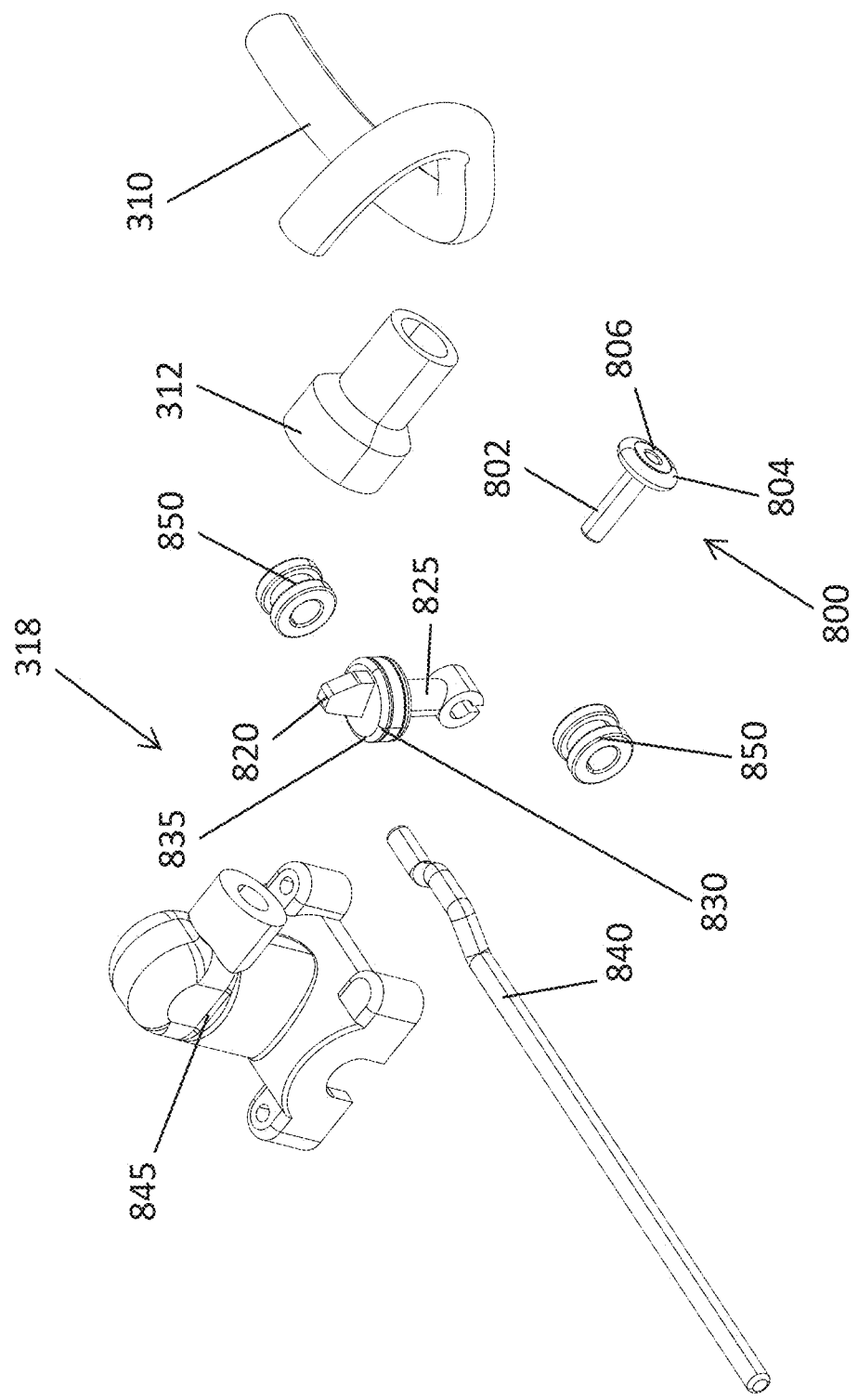

FIGS. 30-31 show various aspects of the pneumatic motor 318 including the flexible tube 310 and the intake one-way valve housing 312 and an one-way valve 800 with a valve pin 802 in a T shape with an o-ring 804 around the head 806. The piston 820 and connecting rod 825 are molded as a single piece. The seal 830 around the piston 820 is floated on a channel 835 defined on the piston. There is no spring to activate the air valve in the motor, a simple turn of the propeller will activate the motor. The piston 820 snaps onto the crank shaft 840 that serves as the shaft 255, which connects to the propeller. A motor hosing 845 is situated around the entire motor and connects to the housing mount 650. A pair of bushings 850 may also be provided.

Figure 32:
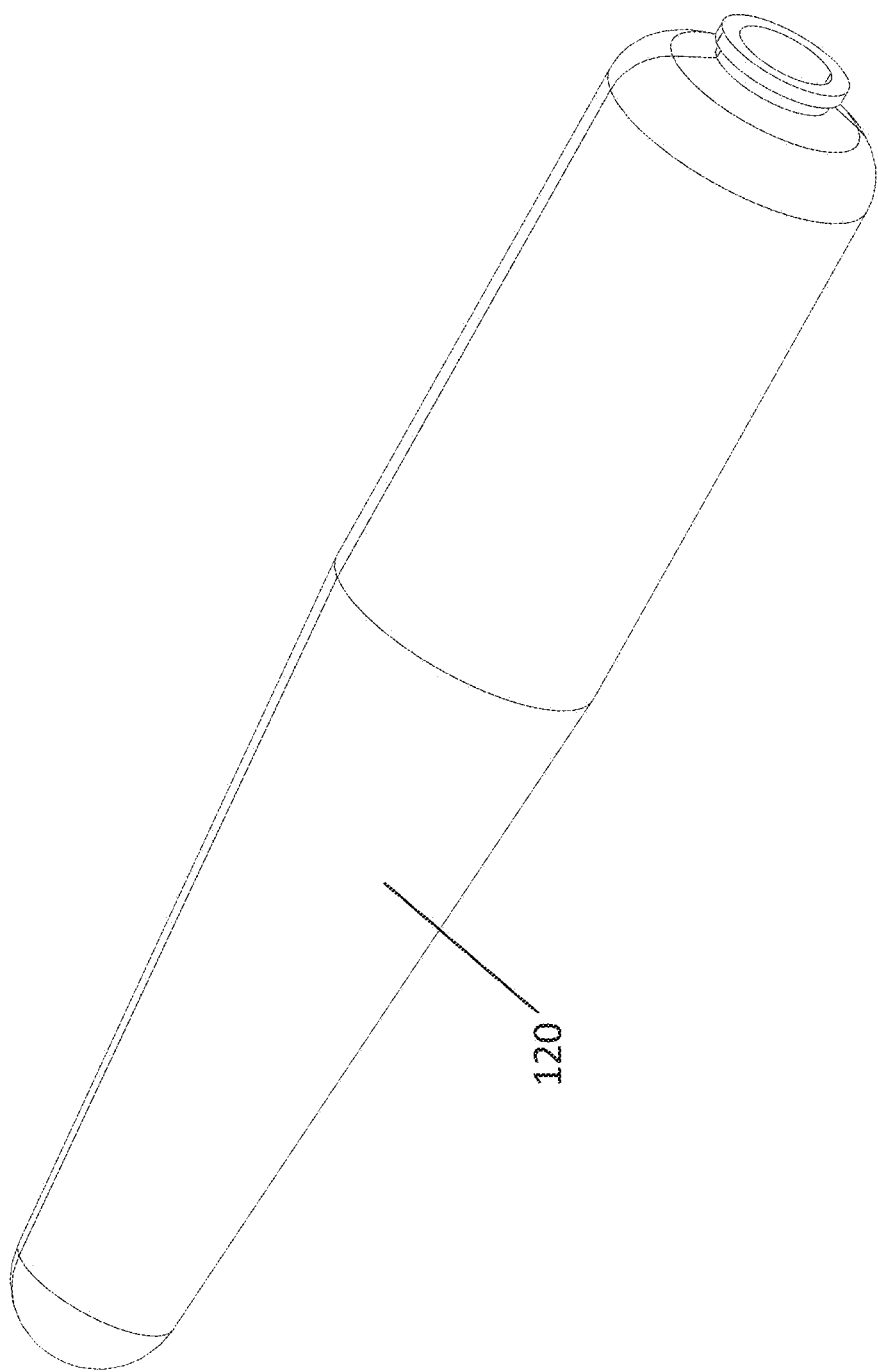
FIG. 32 is a perspective view of the canister.
Figure 33:
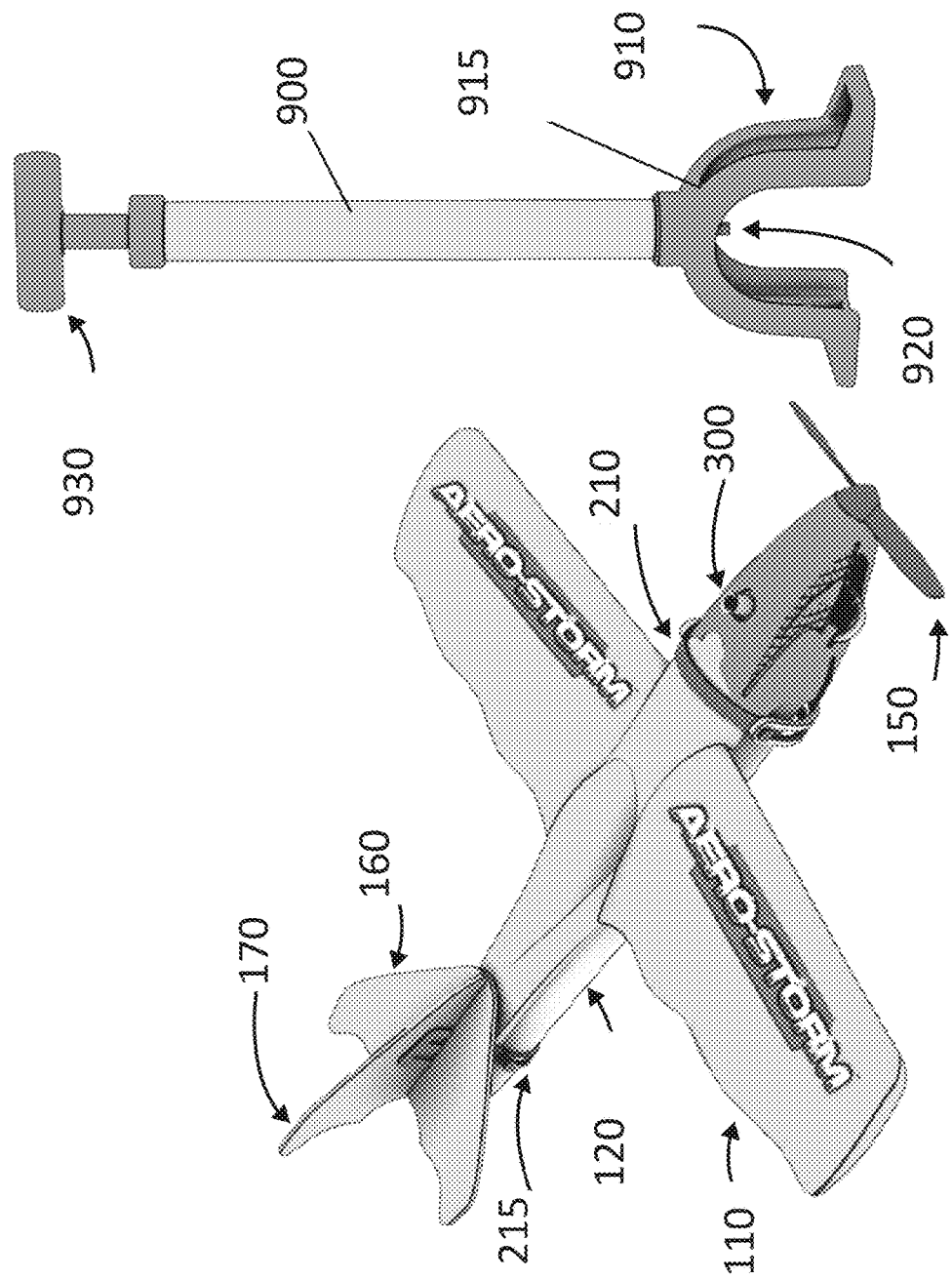
Figure 34:
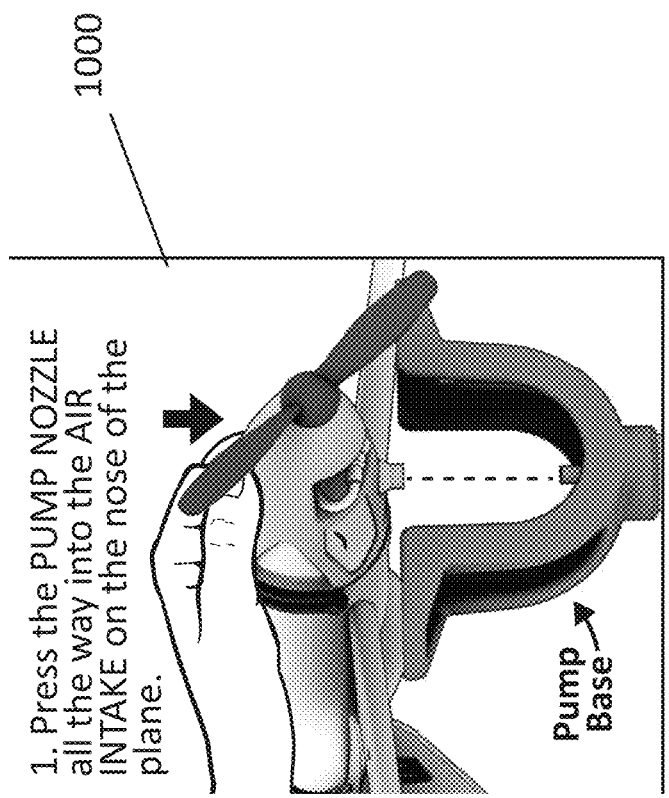
Figure 35:
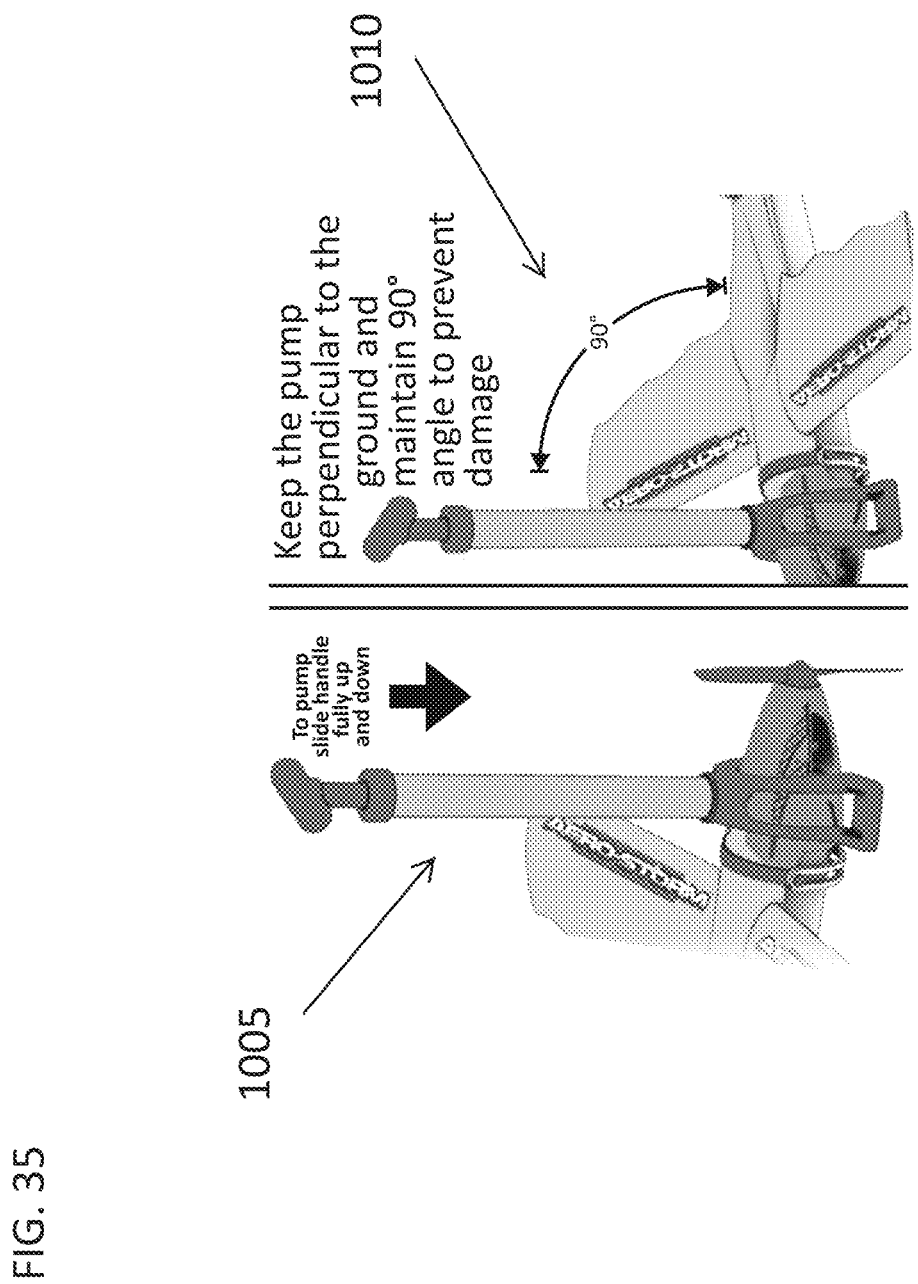
Figure 36:
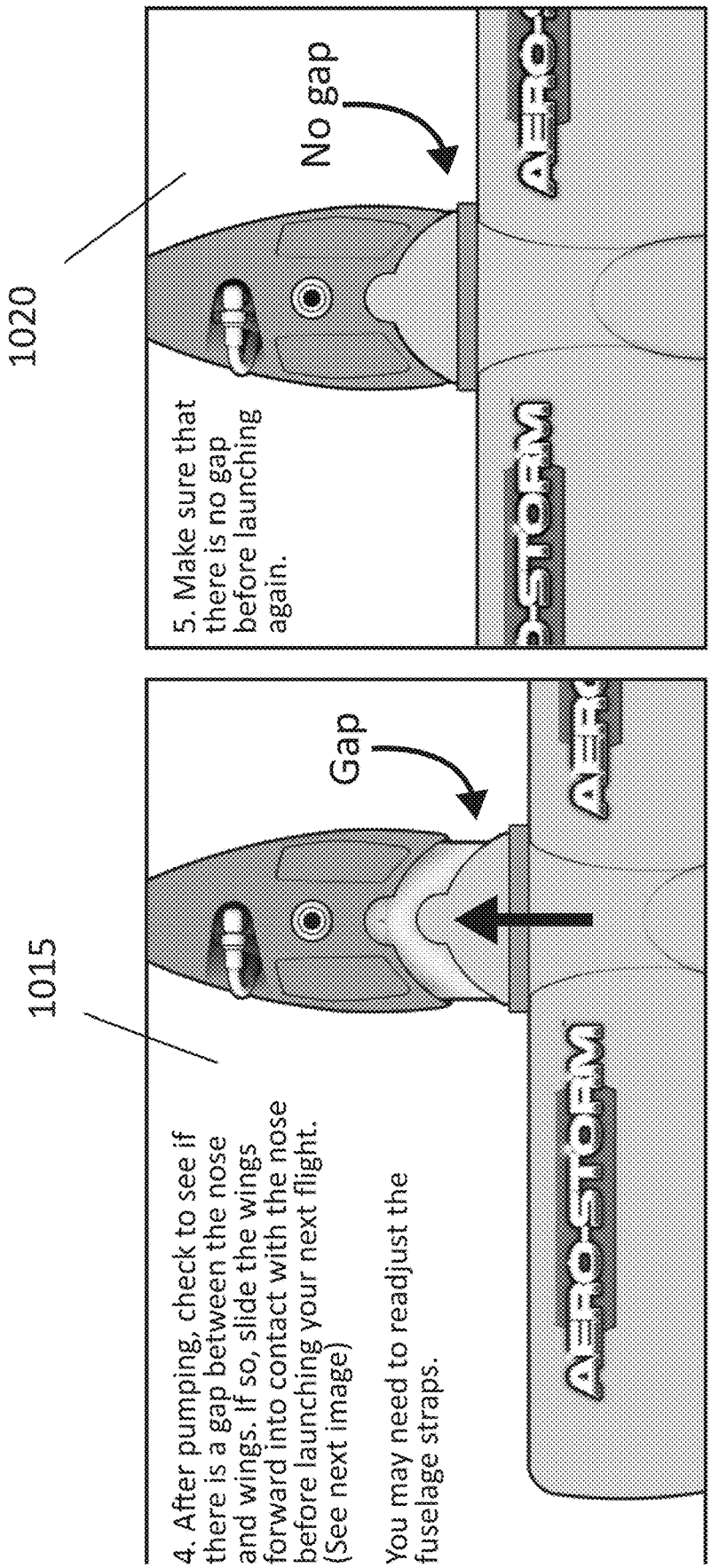

FIG. 32 show the canister 120, which as described includes a tapering downwardly from the front end to the rear end.

FIGS. 33-37 illustrate the operation of the flying toy. As illustrated, a pneumatic pump 900 includes a pump base 910 with an arch 915 that fits over the nose section 200. A pump nozzle 920 fits into the air intake 300 and the pump handle 930 is used to pump and pressurize the air in the canister 120.

As illustrated, the user presses the pump nozzle into the air intake on the nose of the plane (FIG. 34), box 1000. The user can then place the flying toy 100 on the ground for support (FIG. 35) and the pump base which arches around the nose provides further support against the ground, box 1005. The user can then pump the hand pump, box 1010. The user can then check to make sure the wing assembly is secured to the nose section but pushing the forward tab into the curved opening on the nose section (boxes 1015 and 1020, FIG. 36). The user can then launch the toy by throwing it or flicking the propeller (box 1025, FIG. 37). Various flying attributes can be adjusted (Box 1030, FIG. 37).

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or inferred.

We claim:

1. A flying toy comprising:
   a nose assembly;
   a wing assembly having a front end positioned against the nose assembly and having a rear end and configured to define a pair of wings extending from a fuselage with a tail base extending from the rear end;
   a refillable canister secured under the wing assembly by a front fastener and a rear fastener;
   a tail assembly configured with vertical and horizontal stabilizers, the tail assembly secured to the tail base by the rear fastener;
   a manifold positioned within the nose assembly and secured to the refillable canister;
   a pneumatic motor housed within the nose assembly and secured to the manifold, the pneumatic motor being configured to include a motor inlet in a first fluid connection to the refillable canister such that a pressurized fluid contained in the refillable canister fuels the pneumatic motor, and wherein the pneumatic motor uses pressurized fluid to rotate an axle;
   a propeller secured to the axle for rotation when the pneumatic motor operates;
   a horizontal stabilizer configured as a single v-shaped base to define left and right horizontal stabilizer edges and wherein the horizontal stabilizer includes a stabilizer slot about the front of the v-shaped base and extending towards a middle portion of the v-shaped base and further includes a notch along a rear portion of the v-shaped base;
   a vertical stabilizer having a flat bottom edge with a side extending therefrom and a tab extending below the flat bottom edge, wherein the tab is received by the notch in the horizontal stabilizer; and
   wherein the rear fastener further includes a base support extending from a curved flange and includes a pair of vertical clips extending upwardly from the base support, the tail base further including a tail slot therethrough, and wherein the curved flange of the rear fastener being positioned under the tail base such that the pair of vertical clips are fitted through the tail slot and through the stabilizer slot to secure around the side of the vertical stabilizer.

2. The flying toy of claim 1, wherein a center of gravity of the flying toy is adjusted by moving forward or backward the pair of vertical clips through the slots and placement of its connection to the vertical stabilizer.

3. The flying toy of claim 1, wherein the first fluid connection between the pneumatic motor and the refillable canister includes:
   a first opening through the manifold and leading into the refillable canister;
   a flexible connecting tube from the first opening to the motor inlet on the pneumatic motor; and
   a one-way motor valve configured only to allow fluid from the refillable canister into the pneumatic motor.

4. The flying toy of claim 3, further comprising:
   an air intake connector having a canister inlet extending from a top portion of the nose assembly, the air intake connector in fluid communication with a second opening through the manifold and leading into the refillable canister; and
   a one-way canister valve configured only to allow air into the canister.

5. The flying toy of claim 1, further comprising:
   a pneumatic pump having an arched base with legs extending on either side of the arched base, a pump nozzle positioned in the arched base and a pump handle, wherein the arched base is configured to fit around the nose assembly when the pump nozzle is connected to an air intake connector and wherein the pump handle is used to pump and pressurize air into the refillable canister.

6. The flying toy of claim 1, wherein the front fastener and rear fastener are defined to each include at least: an u-shaped connector and an elastic connector, wherein the elastic connector being secured in a stretched state around the canister and includes looped ends that secure around knobs extending on ends of the u-shaped connector.

7. The flying toy of claim 6, wherein the nose assembly includes a pair of curved tabs positioned on an underside portion of the nose assembly, the pair of curved tabs being configured to receive the elastic connector of the front fastener with the u-shaped connector configured to position over a front portion of the wing assembly such that the front fastener captures the wing assembly to the nose assembly with a front portion of the canister secured therebetween.

8. The flying toy of claim 1, wherein the canister is tapered downwardly from a front end to the rear end and wherein the fuselage of the wing assembly includes an underside configured with a curved indented tapering profile to correlating to the profile of the canister.

9. The flying toy of claim 1, wherein the front end of the wing assembly includes a forward tab extending outwardly therefrom and the nose assembly includes a rear notch configured to receive the forward tab, such that applying pressure onto the forward tab into the rear notch aligns and secures the wing assembly to the nose assembly.

10. A flying toy in combination with a pneumatic pump, comprising:
    the flying toy comprising:
    a nose assembly;
    a wing assembly having a front end positioned against a portion of the nose assembly and having a rear end, the wing assembly being configured to define a pair of wings extending from a fuselage with a tail base extending from the rear end;
    a refillable canister secured under the wing assembly by a front fastener and a rear fastener;
    a tail assembly configured with vertical and horizontal stabilizers, the tail assembly secured to the tail base by the rear fastener;

a manifold positioned within the nose assembly and secured to the refillable canister;

an air intake connector having a canister inlet extending from a top portion of the nose section, the air intake connector in fluid communication through the manifold and leading into the refillable canister, the air intake connector further having a one-way canister valve configured only to allow air into the canister;

a pneumatic motor housed within the nose assembly and secured to the manifold, the pneumatic motor being configured to include a motor inlet in a first fluid connection to the refillable canister such that a pressurized fluid contained in the refillable canister fuels the pneumatic motor, and wherein the pneumatic motor uses pressurized fluid to rotate an axle;

a propeller secured to the axle for rotation when the pneumatic motor operates; and the pneumatic pump comprising:
an arched base with legs extending from either side of the arched base, a pump nozzle positioned in the arched base and a pump handle, wherein the arched base is configured to fit around the nose assembly when the pump nozzle is connected to the air intake connector and wherein the pump handle is used to pump and pressurize air into the refillable canister.

11. The flying toy of claim 10, wherein the front fastener and rear fastener are defined to each include at least: an u-shaped connector and an elastic connector, wherein the elastic connector being secured in a stretched state around the canister and includes looped ends that secure around knobs extending on ends of the u-shaped connector.

12. The flying toy of claim 11, wherein the nose assembly includes a pair of curved tabs positioned on an underside portion of the nose assembly, the pair of curved tabs being configured to receive the elastic connector of the front fastener with the u-shaped connector configured to position over a front portion of the wing assembly such that the front fastener captures the wing assembly to the nose assembly with a front portion of the canister secured therebetween.

13. The flying toy of claim 11, wherein the tail assembly includes:
a horizontal stabilizer configured as a single v-shaped base to define left and right horizontal stabilizer edges and wherein the horizontal stabilizer includes a stabilizer slot about the front of the v-shaped base and extending towards a middle portion of the v-shaped base and further includes a notch along a rear portion of the v-shaped base;
a vertical stabilizer having a flat bottom edge with a side extending therefrom and a tab extending below the flat bottom edge, wherein the tab is received by the notch in the horizontal stabilizer; and
wherein the rear fastener further includes a base support extending from a curved flange and includes a pair of vertical clips extending upwardly from the base support, the tail base further including a tail slot therethrough, and wherein the curved flange of the rear fastener being positioned under the tail base such that the pair of vertical clips are fitted through the tail slot and through the stabilizer slot to secure around the side of the vertical stabilizer.

14. The flying toy of claim 10, wherein the canister is tapered downwardly from a front end to the rear end and wherein the fuselage of the wing assembly includes an underside configured with a curved indented tapering profile to correlating to the profile of the canister.

15. The flying toy of claim 10, wherein the front end of the wing assembly includes a forward tab extending outwardly therefrom and the nose assembly includes a rear notch configured to receive the forward tab, such that applying pressure onto the forward tab into the rear notch aligns and secures the wing assembly to the nose assembly.

16. A flying toy comprising:
a wing assembly having a front end and a rear end and configured to define a pair of wings extending from a fuselage with a tail base extending from the rear end, the front end of the wing assembly further having a forward tab;
a nose assembly having a rear notch configured to receive the forward tab, such that applying pressure onto the forward tab into the rear notch aligns and secures the wing assembly to the nose assembly;
a refillable canister secured under the wing assembly by a front fastener and a rear fastener;
a tail assembly configured with vertical and horizontal stabilizers, the tail assembly secured to the tail base by the rear fastener;
a manifold positioned within the nose assembly and secured to the refillable canister;
a pneumatic motor housed within the nose assembly and secured to the manifold, the pneumatic motor being configured to include a motor inlet in a first fluid connection to the refillable canister such that a pressurized fluid contained in the refillable canister fuels the pneumatic motor, and wherein the pneumatic motor uses pressurized fluid to rotate an axle;
a propeller secured to the axle for rotation when the pneumatic motor operates;
an air intake connector having a canister inlet extending from a top portion of the nose section, the air intake connector in fluid communication through the manifold and leading into the refillable canister and a one-way canister valve configured only to allow air into the canister; and
a pneumatic pump having an arched base with legs extending from either side of the arched base, a pump nozzle positioned in the arched base and a pump handle, wherein the arched base is configured to fit around the nose assembly when the pump nozzle is connected to the air intake connector and wherein the pump handle is used to pump and pressurize air into the refillable canister.

17. The flying toy of claim 16, wherein the front fastener and rear fastener are defined to each include at least: an u-shaped connector and an elastic connector, wherein the elastic connector being secured in a stretched state around the canister and includes looped ends that secure around knobs extending on ends of the u-shaped connector.

18. The flying toy of claim 16, wherein the tail assembly includes:
a horizontal stabilizer configured as a single v-shaped base to define left and right horizontal stabilizer edges and wherein the horizontal stabilizer includes a stabilizer slot about the front of the v-shaped base and extending towards a middle portion of the v-shaped base and further includes a notch along a rear portion of the v-shaped base;
a vertical stabilizer having a flat bottom edge with a side extending therefrom and a tab extending below the flat bottom edge, wherein the tab is received by the notch in the horizontal stabilizer; and
wherein the rear fastener further includes a base support extending from a curved flange and includes a pair of vertical clips extending upwardly from the base support, the tail base further including a tail slot therethrough, and wherein the curved flange of the rear fastener being positioned under the tail base such that the pair of vertical clips are fitted through the tail slot and through the stabilizer slot to secure around the side of the vertical stabilizer.

\* \* \* \* \*